United States Patent [19]

Kuboki et al.

[11] 4,428,051

[45] Jan. 24, 1984

[54] ELECTRONIC CONTROL APPARATUS FOR INTERNAL COMBUSTION ENGINE

[75] Inventors: Shigeo Kuboki, Nakaminato; Takeshi Hirayama, Mito; Hideo Nakamura, Tokyo, all of Japan

[73] Assignee: Hitachi, Ltd., Tokyo, Japan

[21] Appl. No.: 204,347

[22] Filed: Nov. 5, 1980

[30] Foreign Application Priority Data

Nov. 9, 1979 [JP] Japan ................................ 54-144463

[51] Int. Cl.[3] ........................ G06F 7/385; G06F 7/50; F02D 5/02

[52] U.S. Cl. ............................... 364/431.12; 364/569; 364/770; 377/42; 377/49; 377/75

[58] Field of Search ...................... 364/431.04, 431.05, 364/431.06, 431.11, 431.12, 569, 770; 377/42, 49, 52, 72, 75, 84, 107

[56] References Cited

U.S. PATENT DOCUMENTS

| | | | |
|---|---|---|---|
| 3,505,511 | 4/1970 | Campano et al. | 364/770 |
| 3,989,940 | 11/1976 | Kihara | 364/770 |
| 3,997,765 | 12/1976 | Marathe | 377/72 |
| 4,075,464 | 2/1978 | Davies, Jr. | 377/107 |
| 4,209,829 | 6/1980 | Leichle | 364/442 |
| 4,210,111 | 7/1980 | Hattori et al. | 123/414 |
| 4,218,750 | 8/1980 | Carter et al. | 364/770 |
| 4,267,437 | 5/1981 | Shinoda et al. | 377/52 |
| 4,276,601 | 6/1981 | Tokuda et al. | 364/431.12 |
| 4,280,190 | 6/1981 | Smith | 364/770 |
| 4,298,941 | 11/1981 | Furuhashi | 364/431.04 |

OTHER PUBLICATIONS

Parker: Programmable Multifunction Pulse Counter-Timer, IBM Tech. Disclosure Bulletin, vol. 22, No. 4, Sep. 79.

Stephens: Programmable Event Timer, IBM Tech. Disclosure Bulletin, vol. 22, No. 2, Jul. 79.

*Primary Examiner*—Felix D. Gruber

*Attorney, Agent, or Firm*—Antonelli, Terry & Wands

[57] ABSTRACT

A control apparatus for an internal combustion engine includes pulse converter blocks each comprising a register, a detection circuit for determining if the information content of the register has met a predetermined condition and an increment/decrement circuit for incrementing or decrementing the information content of the register. A block is provided for each of the output signals from a CPU, and the pulse converter blocks are driven by a common clock pulse so that the counting operations and the condition detecting operations of the blocks are effected in synchronism with the common clock pulse.

16 Claims, 41 Drawing Figures

ELECTRONIC CONTROL APPARATUS FOR INTERNAL COMBUSTION ENGINE

FIELD OF THE INVENTION

The present invention relates to an electronic control apparatus for an internal combustion engine which controls the internal combustion engine by digital arithmetic operations by a central processing unit (CPU), and more particularly to a pulse signal processing circuit at a signal input and output portion of the CPU.

BACKGROUND OF THE INVENTION

When the engine is controlled by a programmed CPU, an input circuit for holding information from sensors which detect engine conditions, in the form capable of being transmitted to the CPU in response to a request from the CPU, and an output circuit for converting digital signals from the CPU to a pulse signal for driving an engine control mechanism are required. Those input and output circuits must be fabricated in the form of a highly integrated circuit.

However, since the engine controlling circuits are mounted on a vehicle, the surrounding temperature changes significantly depending on the conditions under which the vehicle is operated. As a result, the circuits must be designed taking the worst condition into consideration and hence a high integration density has been difficult because of thermal requirements. For example, the vehicles may be used in a tropical zone or they may be used in broiling weather. Taking those conditions into consideration, the surrounding temperature may rise to a very high temperature (for example, 100° C. while taking the influence of radiation heat of the engine into consideration). It is necessary to avoid the heat concentration so that the junction temperature of a circuit component is kept below a prescribed temperature even under those conditions. For this reason, the integration density could not be increased.

In order to resolve the above problem, it is necessary to construct the input and output circuits by a circuit configuration having circuit components having a small amount of heat generation.

SUMMARY OF THE INVENTION

It is an object of the present invention to provide a control apparatus for an engine which can be constructed by circuits having a small amount of heat generation.

In accordance with the present invention, pulse converter blocks, each comprising a register, a detection circuit for determining if the information content of the register has met a predetermined condition and an increment/decrement circuit for incrementing or decrementing the information content of the register are provided, one for each of the output signals from the CPU, and the pulse converter blocks are driven by a common clock pulse so that the counting operations and the condition detecting operations of the blocks are effected in synchronism with the common clock pulse.

With this arrangement, each of the shift registers of the pulse converter circuits can be implemented by regularly arranging very simple circuit components, and the circuit configuration is simple and regular. As a result, the heat generation of the entire circuit configuration is small and no heat concentration occurs.

Furthermore, the arrangement of the present invention allows the use of dynamic circuit components as required. In this case, the heat generation is further decreased, for example, to 40% of that of a conventional digital engine control circuit.

BRIEF DESCRIPTION OF THE DRAWINGS

The above and other objects, features and advantages of the present invention will be more clear from the following description taken in conjunction with the accompanying drawings, in which.

DETAILED DESCRIPTION

Prior to explanation of an examplary embodiment of the invention, an example of an electronic type engine control system to which the present invention is applicable will be described by referring to FIGS. 1 to 10. The engine control system shown in FIGS. 1 to 10 is described in a copending U.S. application Ser. No. 137,519 filed on Apr. 4, 1980 by Toshio Furuhashi entitled "Electronic type engine control method and apparatus" assigned to the assignee of the present application now U.S. Pat. No. 4,337,513.

Figure 1:
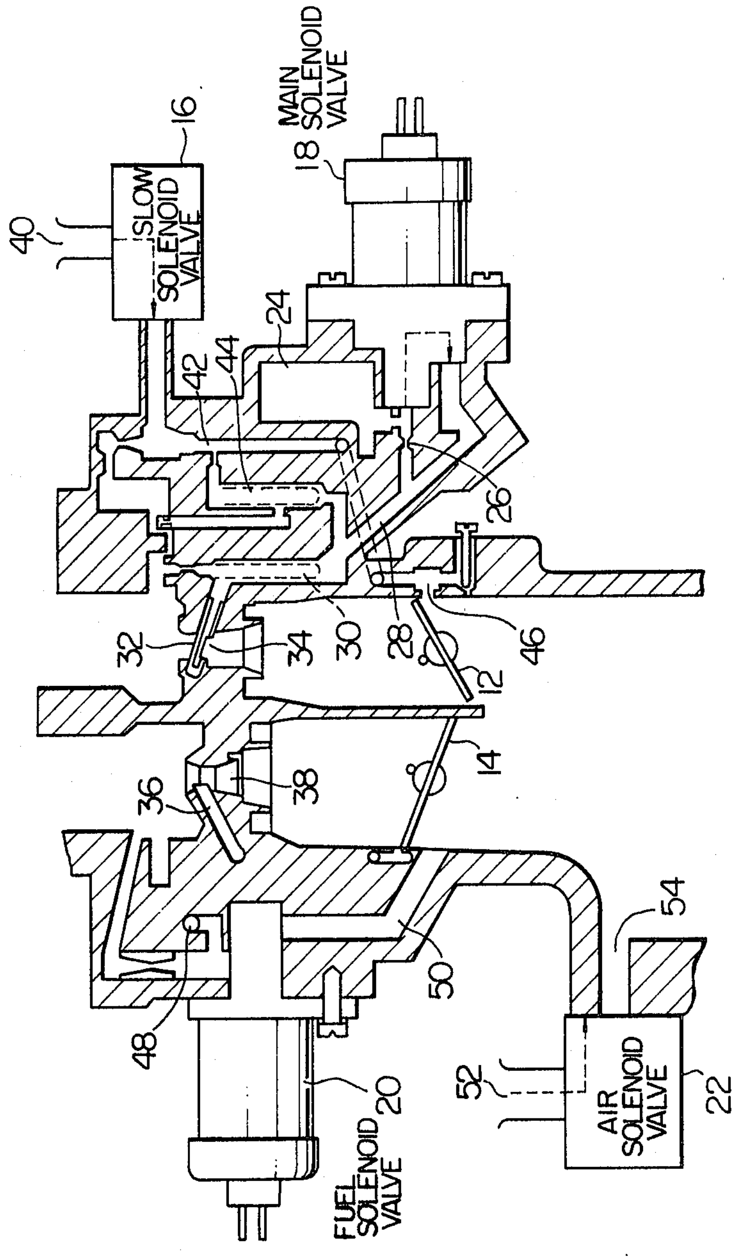
FIG. 1 is a sectional view of a throttle chamber of an engine to which the present invention is preferably applied.

FIG. 1 is a sectional view showing a throttle chamber of an internal combustion engine which preferably employs the invention. Various solenoid valves are provided around the throttle chamber for controlling the fuel quantity and the bypass air flow supplied to the throttle chamber, as will be described below.

Opening of a throttle valve 12 for a low speed operation is controlled by an acceleration pedal (not shown), whereby air flow supplied to individual cylinders of the engine from an air cleaner (not shown) is controlled. When the air flow passing through a venturi 34 for the low speed operation is increased as the result of an increased opening of the throttle valve 12, a throttle valve 14 for a high speed operation is opened through a diaphragm device (not shown) in dependence on a negative pressure produced at the venturi for the low speed operation, resulting in a decreased air flow resistance which would otherwise be increased due to the increased intake air flow.

The quantity of air flow fed to the engine cylinders under the control of the throttle valves 12 and 14 is detected by a negative pressure sensor (not shown) and converted into a corresponding analog signal. In dependence on the analog signal thus produced as well as other signals available from other sensors which will be described hereinafter, the opening degrees of various solenoid valves 16, 18, 20 and 22 shown in FIG. 1 are controlled.

Next, description will be made of the control of the fuel supply. The fuel fed from a fuel tank through a conduit 24 is introduced into a conduit 28 through a main jet orifice 26. Additionally, fuel is introduced to the conduit 28 through a main solenoid valve 18. Consequently, the fuel quantity fed to the conduit 28 is increased as the opening degree of the main solenoid valve 18 is increased. Fuel is then fed to a main emulsion tube 30 to be mixed with air and supplied to the venturi 34 through a main nozzle 32. At the time when the throttle valve 14 for high speed operation is opened, fuel is additionally fed to a venturi 38 through a nozzle 36. On the other hand, a slow solenoid valve (or idle solenoid valve) 16 is controlled simultaneously with the main solenoid valve 18, whereby air supplied from the air cleaner is introduced into a conduit 42, through an inlet port 40. Fuel fed to the conduit 28 is also supplied to the conduit or passage 42 through a slow emulsion tube 44. Consequently, the quantity of fuel supplied to the conduit 42 is decreased as the quantity of air supplied through the slow solenoid valve 16 is increased. The mixture of air and fuel produced in the conduit 42 is then supplied to the throttle chamber through an opening 46 which is also referred to as the slow hole.

The fuel solenoid valve 20 serves to increase the fuel quantity for the engine starting and warming-up operations. Fuel introduced through a hole 48 communicating with the conduit 24 is fed to a conduit 50 communicating with the throttle chamber in dependence on the opening degree of the fuel solenoid valve 20.

The air solenoid valve 22 serves to control the air quantity supplied to the engine cylinders. To this end, the air solenoid valve 22 is supplied with air from the air cleaner through an opening 52, whereby air is introduced into a conduit 54 opening in the throttle chamber in a quantity corresponding to the opening degree of the air solenoid valve.

The slow solenoid valve 16 cooperates with the main solenoid valve 18 to control the fuel-air ratio, while the fuel solenoid valve 20 functions to increase the fuel quantity. Further, the engine speed at the idling operation is controlled through cooperation of the slow solenoid valve 16, the main solenoid valve 18 and the air solenoid valve 22.

Figure 2:
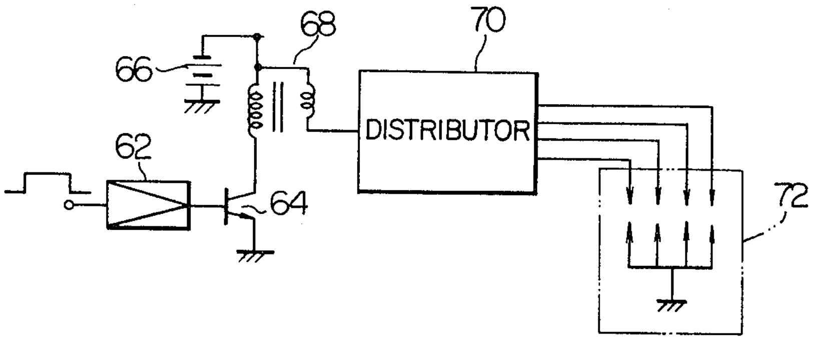
FIG. 2 shows a schematic diagram of an ignition device.

Referring to FIG. 2, which shows schematically an arrangement of an ignition system, a pulse current is supplied to a power transistor 64 through an amplifier circuit 62, as the result of which the power transistor 64 is turned on (i.e. becomes conductive), whereby a primary current is caused to flow through a primary winding of an ignition coil 68 from a battery 66. In response to the trailing edge of the current pulse, the transistor 64 is turned off (i.e. non-conductive or blocked), to give rise to induction of a high voltage in a secondary winding of the ignition coil 68.

The high voltage thus produced is then supplied to spark plugs 72 of the individual cylinders of the internal combustion engine through a distributor 70 in synchronism with the rotation of the engine.

Figure 3:
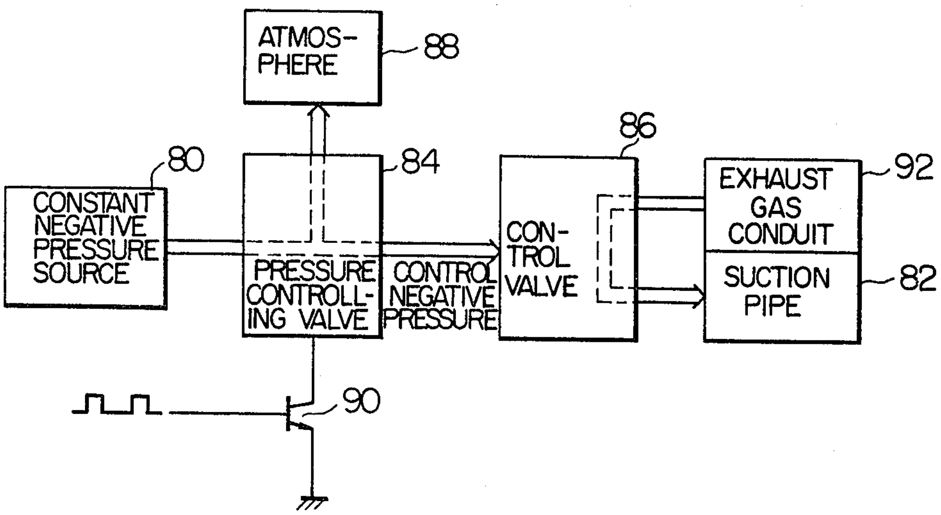
FIG. 3 shows a systematic diagram of an exhaust gas reflow apparatus.

FIG. 3 is a diagram to illustrate the operation of an exhaust gas recirculating system (hereinafter referred to also as an EGR system). A constant negative pressure derived from a constant negative pressure source 80 is applied to a control valve 86 through a constant-pressure valve, i.e. pressure controlling valve 84, which serves to control the ratio at which the constant negative pressure from the negative pressure source 80 escapes to the atmosphere 88 in dependence on the duty cycle of a pulse signal applied to a transistor 90, to thereby control the negative pressure level applied to the control valve 86. In other words, the negative pressure applied to the control valve 86 is determined on the basis of the duty cycle of the transistor 90. On the other hand, the quantity of recirculated exhaust gas from an exhaust conduit 92 to an intake conduit 82 is controlled by the control negative pressure applied from the constant pressure valve 84.

Figure 4:
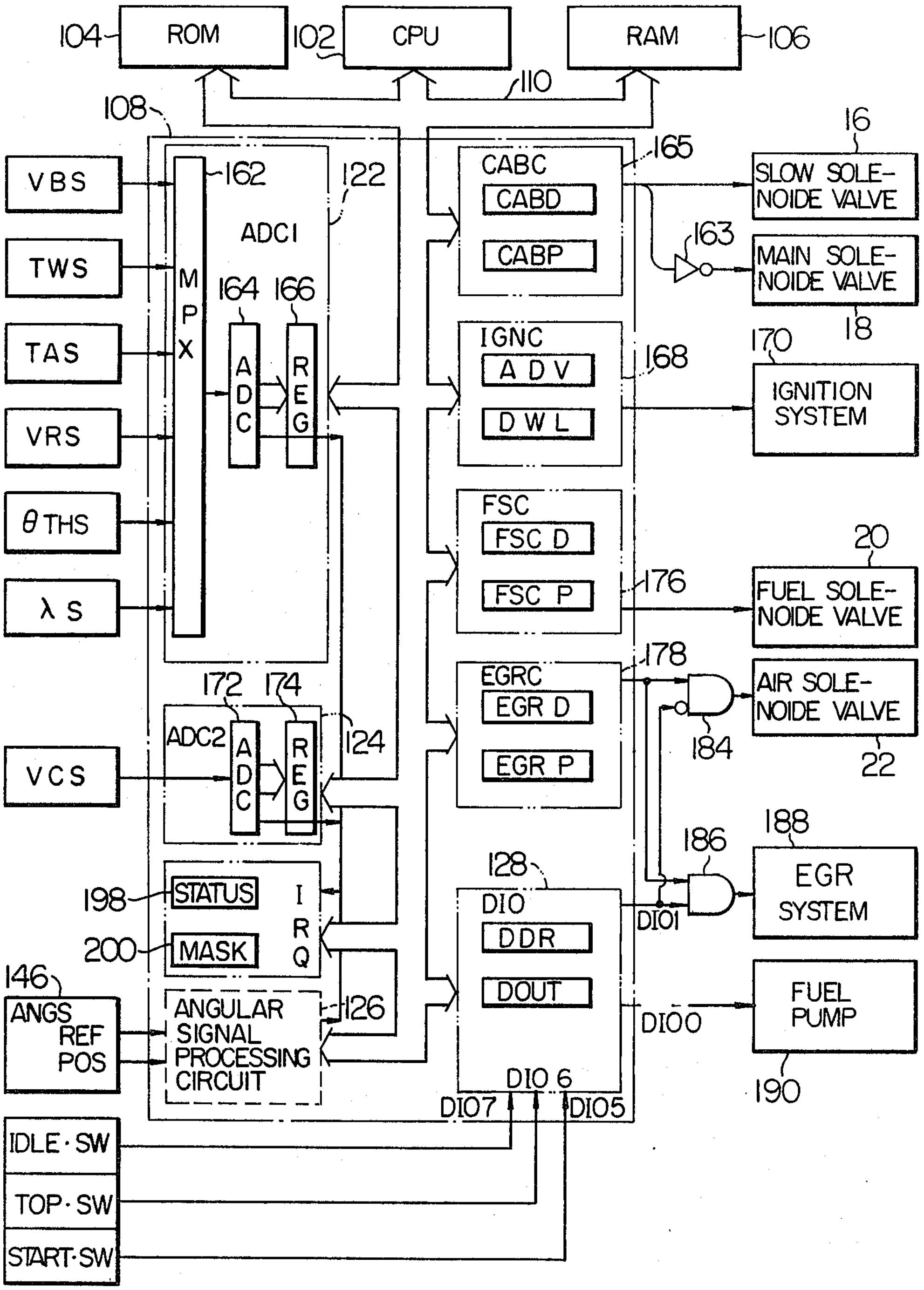
FIG. 4 shows an overall configuration of a control system.

FIG. 4 shows in a schematic diagram a general arrangement of the overall control system. The control system includes a central processing unit (hereinafter referred to as CPU) 102, a read-only memory (hereinafter referred to as ROM) 104, a random access memory (hereinafter referred to as RAM) 106, and an input/output interface circuit 108. The CPU 102 performs arithmetic operations for input data from the input/output circuit 108 in accordance with various programs stored in ROM 104 and feeds the results of arithmetic operation back to the input/output circuit 108. Temporal data storage as required for executing the arithmetic operations is accomplished by using the RAM 106. Various data transfers or exchanges among the CPU 102, ROM 104, RAM 106 and the input/output circuit 108 are realized through a bus line 110 composed of a data bus, a control bus and an address bus.

The input/output interface circuit 108 includes input means constituted by a first analog-to-digital converter (hereinafter referred to as ADC1), a second analog-to-digital converter (hereinafter referred to as ADC2), an angular signal processing circuit 126, and a discrete input/output circuit 128 (hereinafter referred to as DIO) for inputting or outputting single-bit information.

The ADC1 122 includes a multiplexer 162 (hereinafter referred to as MPX) which has input terminals applied with output signals from a battery voltage detecting sensor (hereinafter referred to as VBS), a sensor for detecting temperature of cooling water (hereinafter referred to as TWS), an ambient temperature sensor (hereinafter referred to as TAS), a regulated-voltage generator (hereinafter referred to as VRS), a sensor for detecting a throttle angle (hereinafter referred to as ↓THS) and a λ-sensor (hereinafter referred to as λS). The multiplexer or MPX 162 selects one of the input signals to supply it to an analog-to-digital converter circuit 164 (hereinafter referred to as ADC). A digital signal output from the ADC 164 is held by a register 166 (hereinafter referred to as REG).

The output signal from a negative pressure sensor (hereinafter referred to as VCS) is supplied to the input of ADC2 124 to be converted into a digital signal through an analog-to-digital converter circuit (hereinafter referred to as ADC) 172. The digital signal output from the ADC 172 is set in a register (hereinafter referred to as REG) 174.

An angle sensor 146 (hereinafter termed ANGS) is adapted to produce a signal representative of a standard or reference crank angle, e.g. of 180° (this signal will be hereinafter termed REF signal) and a signal representative of a minute crank angle (e.g. 1°) which signal will be hereinafter referred to as POS signal. Both of the signals REF and POS are applied to the angular signal processing circuit 126 to be shaped.

The discrete input/output circuit or DIO 128 has inputs connected to an idle switch (hereinafter referred to as IDLE-SW), a top-gear switch (hereinafter termed TOP-SW) and a starter switch (hereinafter referred to as START-SW).

Next, description will be made of a pulse output circuit as well as objects or functions to be controlled on the basis of the results of arithmetic operations executed by CPU 102. A fuel-air ratio control device 165 (hereinafter referred to as CABC) serves to vary the duty cycle of a pulse signal supplied to the slow solenoid valve 16 and the main solenoid valve 18 for the control thereof. Since increasing the duty cycle of the pulse signal through control by CABC 165 has to involve decreasing the fuel supply quantity through the main solenoid valve 18, the output signal from CABC is applied to the main solenoid valve 18 through an inverter 163. On the other hand, the fuel supply quantity controlled through the slow solenoid valve 16 is increased, as the duty cycle of the pulse signal produced from the CABC 165 is increased. The CABC 165 includes a register (hereinafter referred to as CABP) for setting therein the pulse repetition period of the pulse signal described above and a register (hereinafter referred to as CABD) for setting therein the duty cycle of the same pulse signal. Data for the pulse repetition period and the duty cycle to be loaded in these registers CABP and CABD are available from the CPU 102.

An ignition pulse generator circuit 168 (hereinafter referred to as IGNC) is provided with a register (hereinafter referred to as ADV) for setting therein ignition timing data and a register (hereinafter referred to as DWL) for controlling a duration of the primary current flowing through the ignition coil. Data for these controls are available from the CPU 102. The output pulse from the IGNC 168 is applied to the ignition system denoted by 170 in FIG. 4. The ignition system 170 is implemented in such an arrangement as described hereinbefore by referring to FIG. 2. Accordingly, the output pulse from the IGNC 168 is applied to the input of the amplifier circuit 62 shown in FIG. 2.

A fuel increasing pulse generator circuit 176 (hereinafter referred to as FSC) serves to control the duty cycle of a pulse signal applied to the fuel solenoid valve 20 shown in FIG. 1 for the control thereof and includes a register for setting therein the pulse repetition period of the pulse signal (this resister will be hereinafter referred to as FSCP) and a register (hereinafter referred to as FSCD) for setting the duty cycle of the same pulse signal.

A pulse generator circuit 178 (hereinafter referred to as EGRC) for producing a pulse signal to control the quantity of exhaust gas to be recirculated (EGR) includes a register (hereinafter termed EGRP) for setting the pulse repetition period and a register (hereinafter termed EGRD) for setting the duty cycle of the pulse signal which is supplied to the air solenoid valve 22 through an AND gate 184 having the other input supplied with the output signal DIO1 from the DIO 128. More specifically, when the signal DIO1 is at a level "L", the AND gate 184 is enabled to conduct therethrough the control pulse signal for controlling the air solenoid valve 22.

On the other hand, when the signal DIO1 is at a level "H", an AND gate 186 is made conductive to control the EGR system 188, a fundamental construction of which is illustrated in FIG. 3.

The DIO 128 is an input/output circuit for a single bit signal as described hereinbefore and includes to this end a register (hereinafter referred to as DDR) for holding data to determine the output or input operation, and a register (hereinafter referred to as DOUT) for holding data to be output. The DIO 128 produces an output signal DIO0 for controlling the fuel pump 190.

Figure 5:
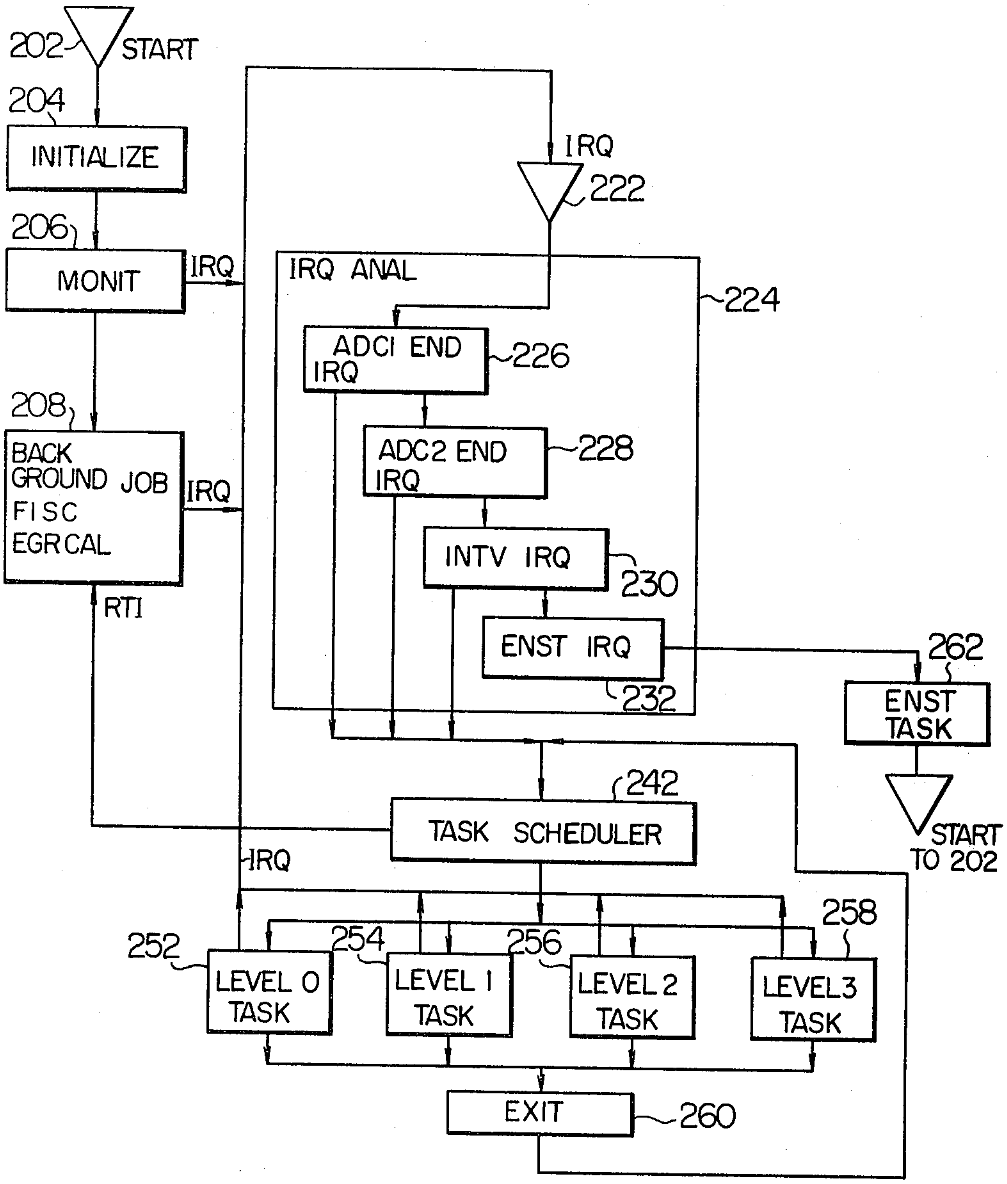
FIG. 5 shows a program system diagram.

FIG. 5 illustrates a program system for the control circuit shown in FIG. 4. When a power supply source is turned on by a key switch (not shown), the CPU 102 is set in a start mode to execute an initialization program (INITIALIZE). Subsequently, a monitor program (MONIT) 206 is executed, which is followed by execution of background job (BACKGROUND JOB) 208. The background jobs include, for example, task for calculating the quantity of EGR (hereinafter referred to as EGR CAL. task) and task for calculating the control quantities for the fuel solenoid valve 20 and the air solenoid valve 22 (hereinafter referred to as FISC). When an interrupt request (hereinafter termed IRQ) occurs during the execution of these tasks, an IRQ analyzing program 224 (hereinafter termed IRQ ANAL) is executed from the start step 222. The program IRQ ANAL is constituted by an end interrupt processing program 226 for the ADC1 (hereinafter referred to as ADC1 END IRQ), an end interrupt processing program 228 for the ADC2 (hereinafter referred to as ADC2 END IRQ) and an interval interrupt processing program 230 (hereinafter referred to as INTV IRQ), and an engine stop interrupt processing program 232 (hereinafter referred to as ENST IRQ) and issues activation requests (hereinafter referred to as QUEUE) to the tasks to be activated among those described below.

The tasks to which the request QUEUE is issued from the subprograms ADC1 END IRQ 226, ADC2 END IRQ 228 and INTV IRQ 230 of the program IRQ ANAL 224 are a task group 252 of level "0", a task group 254 of level "1", a task group 256 of level "2" or a task group 258 of level "3" or alternatively given individual tasks which constitute parts of these task groups. The task to which the request QUEUE is issued from the program ENST IRQ 232 is a task program 262 for processing the stopping of the engine (this task will be hereinafter referred to as ENST TASK). When the task program ENST TASK 262 has been executed, the control program is set back to the start mode and the start step 202 is regained.

A task scheduler 242 serves to determine the sequence in which the task groups are executed such that the task groups to which the request QUEUE is issued or execution of which is interrupted are executed starting from the task group of the highest level. In the case of the illustrated example, it is assumed that the level "0" is the highest level. Upon completed execution of the task group of highest level, a termination indicating program 260 (hereinafter referred to as EXIT) is executed to inform this fact to the task scheduler 242. Subsequently, the task group of the next highest level among those in queue is executed and so forth.

When there remains no task group the execution of which is interrupted or to which the request QUEUE is issued, the execution of the background jobs 208 is resumed under the command of the task scheduler 242. Further, when IRQ is issued during execution of the task group among those of level "0" to "3", the starting step 222 of the IRQ processing program is regained.

Identification and functions of the individual task programs are listed in Table 1.

TABLE 1

| Level | Identification of programs | Functions | Activation (Timing) |
|---|---|---|---|
| — | IRQ ANAL | Analysis of IRQ and issue of requests for activating task groups or tasks | IRQ |
| — | TASK SCHEDULER | Determination of task groups of tasks to be executed | End of IRQ ANAL or end of EXIT |
| — | EXIT | Informing of ended executions of task groups | End of individual task groups |
| 0 | AD1IN | Fetching of output from ADC1 | INTV IRQ (10 m . sec) or ADC1END |
| | AD1ST | Initiation of ADC1 | INTV IRQ (10 m . sec) |
| | AD2IN | Fetching of output from ADC2 | INTV IRQ (10 m . sec) or ADC1 END |
| | AD2ST | Initiation of ADC2 | INTV IRQ (10 m . sec) |
| | RPMIN | Fetching of engine speed | INTV IRQ (10 m . sec) |
| 1 | CARBC | Calculation of duty cycle for controlling fuel-air ratio | INTV IRQ (20 m . sec) |
| | IGNCAL | Calculation of ignition timing | INTV IRQ (20 m . sec) |
| | DWLCAL | Calculation of duration of primary current through ignition coil | INTV IRQ (20 m . sec) |
| 2 | LAMBDA | Control of λ | INTV IRQ (40 m . sec) |
| 3 | HOSEI | Calculation of corrections | INTV IRQ (100 m . sec) |
| — | FISC | Calculation for positioning fuel valve and air valve | BACKGROUND JOB |
| — | EGRCAL | Calculation for positioning negative-pressure-controlled valve for EGR | BACKGROUND JOB |
| — | INITIALIZE | Setting initial values at input/output circuit | START or RE-START |
| — | MONIT | Monitoring of START-SW and starting of fuel pump | START or RE-START |
| — | ENST TASK | Stop of fuel pump and resetting of IGN | ENST IRQ |

As can be seen from the above Table 1, there are programs for monitoring or supervising the control system illustrated in FIG. 5 such as programs IRQ ANAL, TASK, SCHEDULER and EXIT. These programs are held in ROM 104 at addresses A000 to A2FF, as is illustrated in FIG. 6.

As the program of level "0", there are AD1ST, AD2IN, AD2ST and RPMIN which are activated usually by INTV IRQ produced every 10 m.sec. Programs of level "1" includes CARBC, IGNCAL and DWLCAL programs which are activated for every INTV IRQ produced periodically at time intervals of 20 m.sec. As the program of level "2", there is LAMBDA which is activated by INTV IRQ every 40 m.sec. The program of level "3" is HOSEI which is activated by INTV IRQ every 100 m.sec. The programs EGRCAL and FISC are for the background jobs. The programs of level "0" are stored in ROM 104 at addresses A700 to AAFF as PROG1, as is shown in FIG. 6. The level "1" programs are stored in ROM 104 at addresses AB00 to ABFF as PROG2. The level "2" programs are stored in ROM 104 at addresses AE00 to AEFF as PROG3. The program of level "3" is stored in ROM 104 at addresses AF00 to AFFF as PROG4. The program for the background jobs is held at B000 to B1FF. A list (hereinafter referred to as SFTMR) of the start address of the programs PROG1 to PROG4 described above is stored at addresses B200 to B2FF, while values representative of the activation periods of the individual programs (hereinafter referred to as TTM) are stored at addresses B300 to B3FF.

Figure 6:
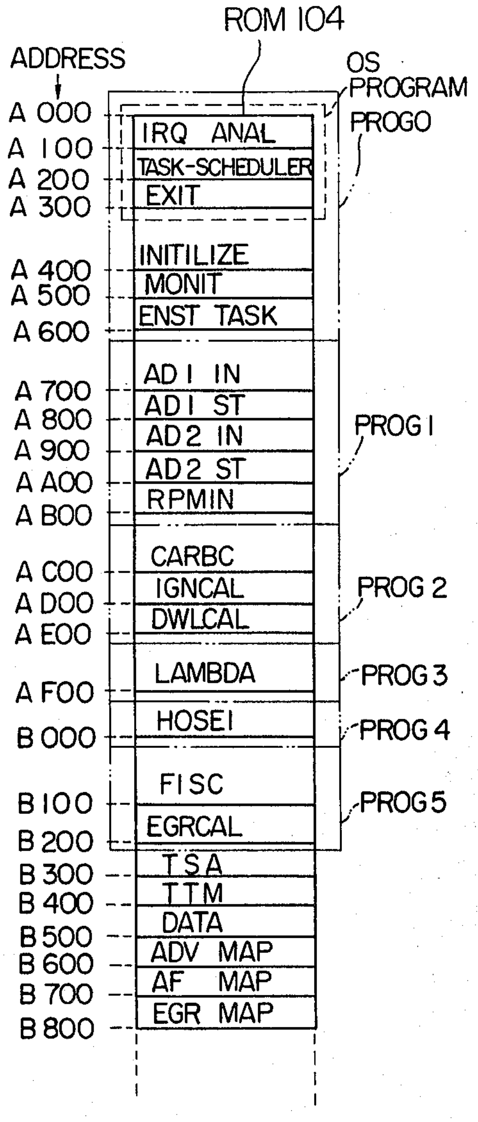
FIG. 6 shows a program map.

Other data as required are stored in ROM 104 at addresses B400 to B4FF, as is illustrated in FIG. 6. In succession thereto, data ADV MAP, AF MAP and EGR MAP are stored at B500 to B7FF.

Now, referring to FIG. 5, processing operations due to the issue or generation of IRQ will be described. The program 224 for analyzing the causes of IRQ comprises subprograms for the processing of ADC1 END IRQ 226, the processing of ADC2 END IRQ 228, the processing of INTV IRQ 230 and the processing ENST IRQ 232. For executing these subprograms 226, 228, 230 and 232, respectively, the contents of the associated IRQ as issued has to be at first examined. To this end, the contents in the STATUS register 198 shown in FIG. 4 are examined for determining the cause for the IRQ having been issued. In accordance with the cause which gives rise to the generation of IRQ in concern, one of the subprograms 226, 228, 230 or 232 is executed, as the result of which the activation request QUEUE is issued to the TASK required to be executed among TASKS 252, 254, 256, 258 and 262.

In this connection, it should be mentioned that when too many IRQs are allowed to be generated, a lot of time is required for executing the supervisory program (hereinafter referred to as the OS program), resulting in that time available for arithmetic operations for the engine control is eventually reduced or restricted. Accordingly, in the case of the embodiment being described, it is assumed that ADC2 END IRQ 288 is allowed to be generated only during the execution of the subprogram 204 or 206 (INITIALIZE or MONIT) and otherwise inhibited. More specifically, an inhibit command, i.e. "L", for ADC2 END IRQ is set at the MASK register 200 (the flip-flop 766 is FIG. 22) shown in FIG. 4. ADC1 END IRQ 226 is originally inhibited. More specifically, at the start step 202, the MASK register is so set by the general rest signal for the input/output circuit that all the interrupt requests are inhibited. The ADC1 END IRQ is caused to remain inhibited by preventing the inhibiting removing command from being issued.

Figure 7:
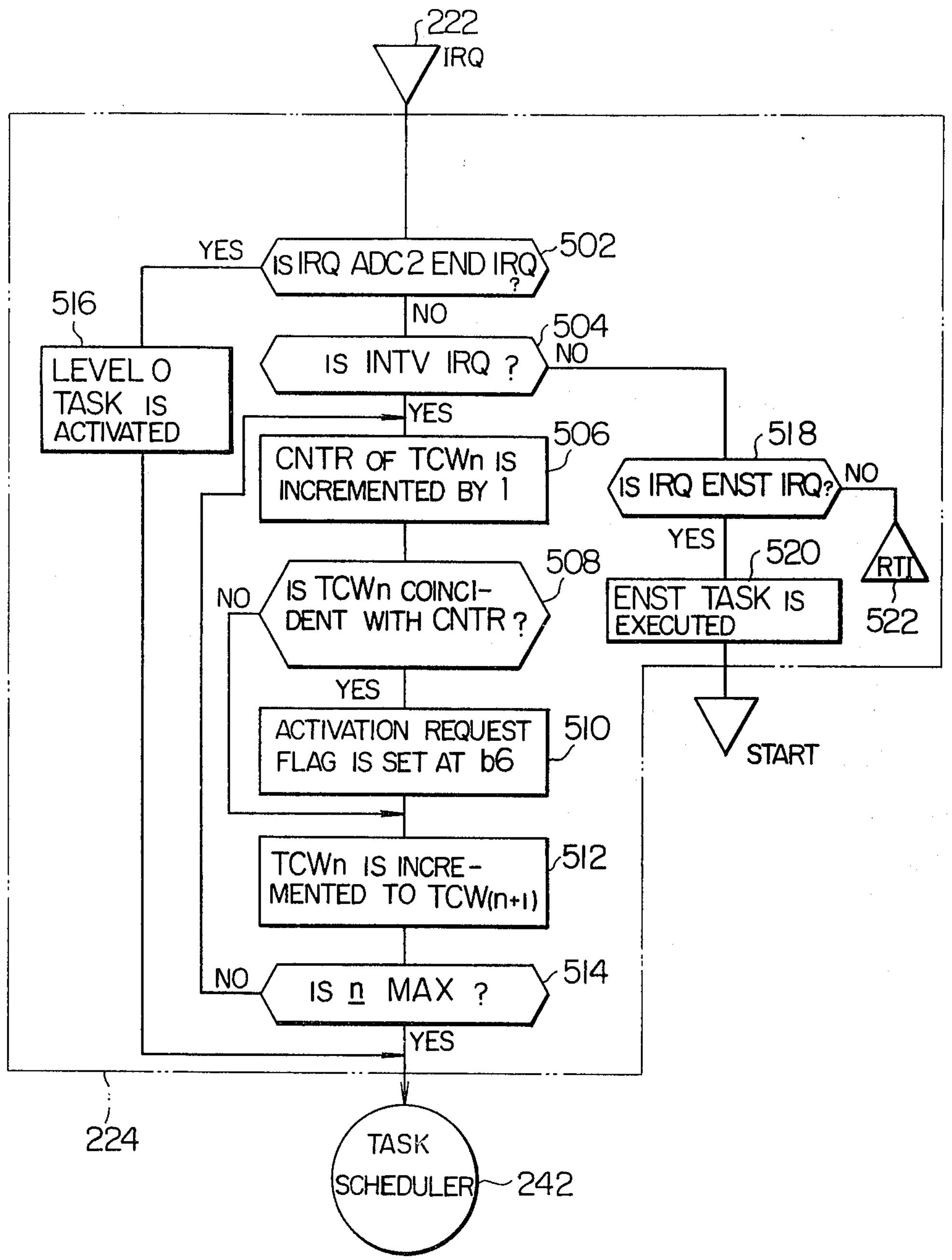
FIG. 7 shows a detailed flow chart of a program 224 shown in FIG. 5.
Figure 9:
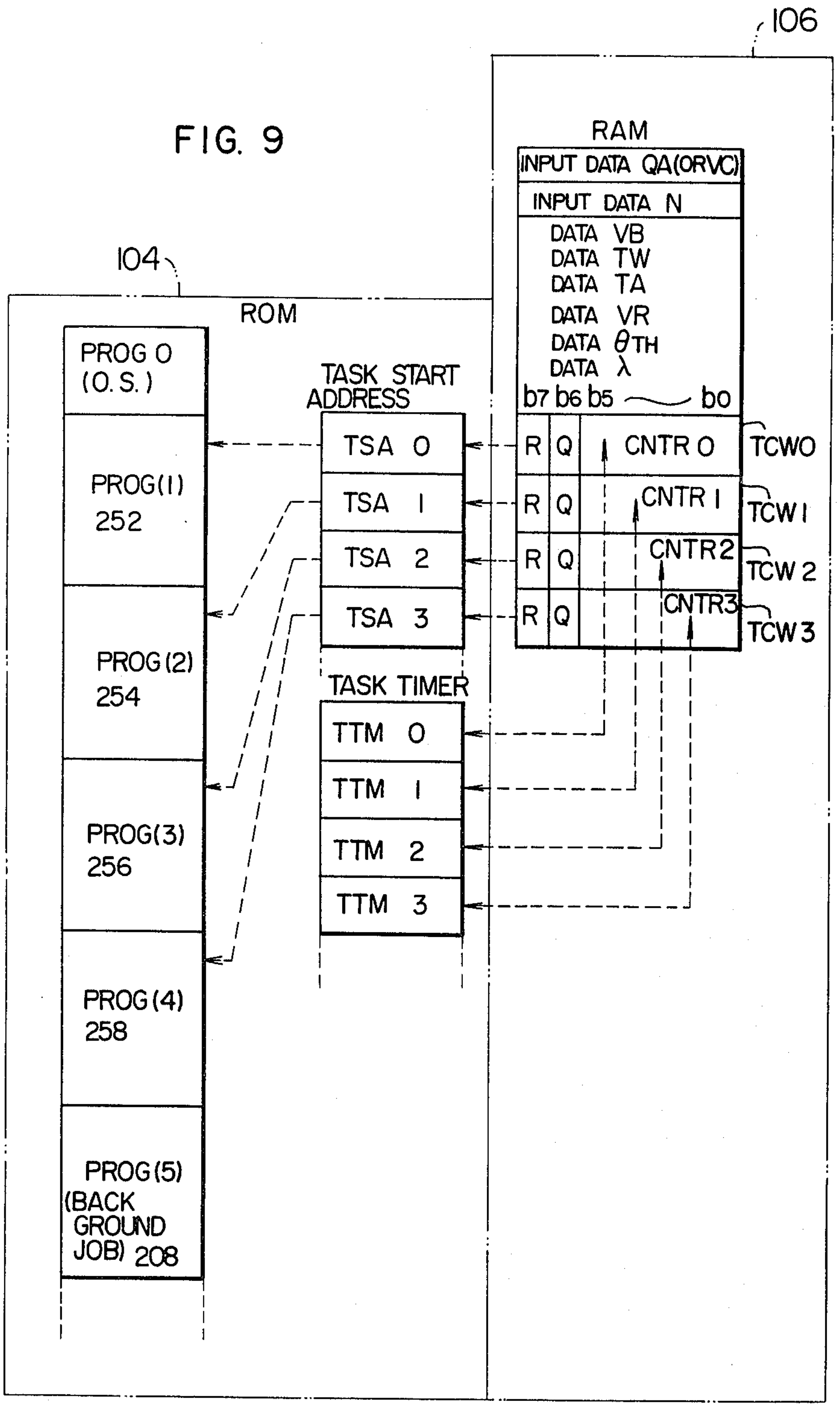
FIG. 9 illustrates a task control table.

An example of the program 224 is illustrated in FIG. 7. This program starts from an entry step 222 and proceeds to a step 502 at which it is decided whether IRQ as issued is ADC2 END IRQ or not. If affirmative (YES), an activation request is issued to the program of the task level "0" at a step 516. This can be accomplished by setting a flag of "1" at b6 of a task control word TCWO in the RAM 106 shown in FIG. 9. The program then proceeds to the TASK SCHEDULER 242. In the case of the embodiment now being described, it is assumed that ADC2 END IRQ is allowed to be generated only during the execution of the INITIALIZ program 204 shown in FIG. 5 and otherwise inhibited. When the decision at the step 502 is NO, the program proceeds to the step 504 at which it is decided whether the IRQ being issued is INTV IRQ generated at a predetermined constant time interval or period. If affirmative or YES, the program proceeds to a step 506. At the steps 506 to 514, the INTV IRQ is examined in connection with the timing for activating the programs of the task level "0" to the task level "3". At first, examination is made as to the program of the task level "0". More specifically, the task control word of the task level "0" i.e. the counter 0 including bits b0 to b5 of TCW 0 shown in FIG. 9 is incremented by "1". In this connection, it should be noted that although up-counting is adopted in this case, down-counting or decrementing may be adopted. At the step 508, the contents of the counter 0 of TCW 0 are compared with that of the task activating timer TTMO shown in FIG. 9. Herein, presence of "1" in TTMO means that the program of task level "0" (denoted by 252 in FIG. 5) is activated every 10 m.sec., since it is assumed that the INTV IRQ is generated at a period or time interval of 10 m.sec. At the step 508, the contents of the counter CNTRO and the task timer TTMO are compared with each other. When coincidence is found (i.e. YES), the program proceeds to the step 510 at which a flag "1" is set at b6 of the task control word TCWO. In the case of the illustrated embodiment, the bits b6 of every TCW represent the flags for requesting the activation of the associated tasks. The bit positions b0 to b5 of the counter CNTRO are all cleared, because the flag of "1" is set at b6 of TCWO at the step 510.

At the step 512, retrieval of the activation timing for the program of task level "1" is effected. At a step 514, it is decided whether the task of level "3" has been ended, i.e. if n=4. Since n=1 in this case, the program returns to the step 506 at which the contents of the counter CNTR1 of TCW1 in RAM 106 shown in FIG. 9 which is the task control word for the program of task level "1" is incremented by "+1". At the step 508, the incremented contents are compared with the contents of TTM1 of ROM 104 shown in FIG. 9. In the case of the illustrated embodiment, it is assumed that the contents of TTM1 is equal to "2". In other words, the timing period for activating the program of the task level "1" is 20 m.sec. Assuming now that the contents of the counter CNTR1 equal "1", the result of decision at the step 508 is NO, which means that the activation timing is not for the program 254 of the task level "1". Thus, the program proceeds to the step 512 at which the task level of the program to be retrieved is updated again to the task level "2". In a similar manner, processing operations are carried out up to the level "3", whereupon n becomes equal to 4 at the step 512. Thus, conditions n=MAX are fulfilled at the step 514. The processing is then transferred to the task scheduler 242.

When no INTV IRQ is found at the step 504, the program proceeds to a step 518 at which it is determined whether the IRQ in question is ENST IRQ. When the decision made at the step 504 is NO, the IRQ must necessarily be ENST IRQ. Accordingly, the step 518 may be omitted and the program may proceed directly to the step 520 at which the fuel pump is stopped in accordance with a specific program based on the engine stop condition. Additionally, all the output signals for the ignition system and the fuel supply control system are reset. The program then returns to the start step 202 shown in FIG. 5.

Figure 8:
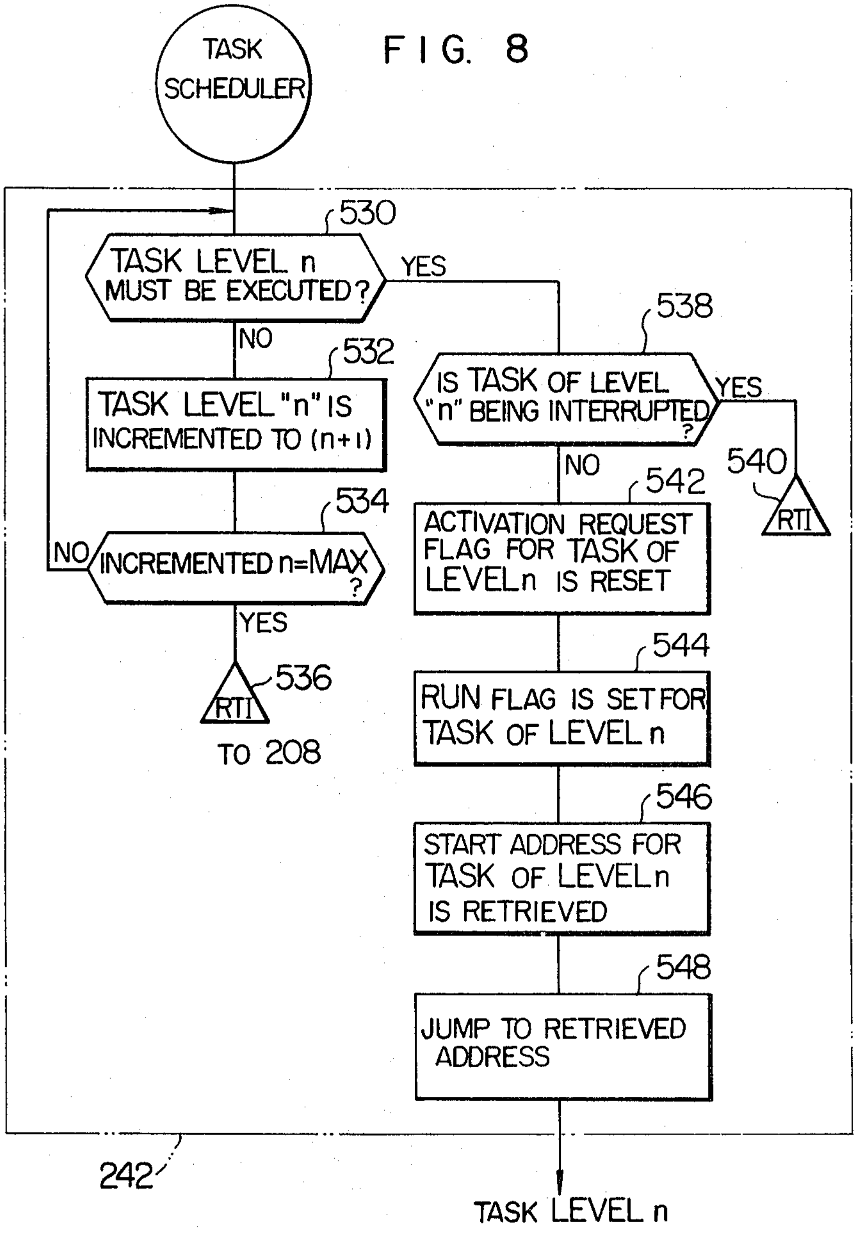
FIG. 8 shows a detailed flow chart of a task scheduler.

FIG. 8 shows in detail in a flow chart a program for the task scheduler 242. At a step 530, it is decided whether the task of task level "n" is needed. At first, n=0. Accordingly, a decision is made as to the necessity of the task of level "0" being executed. In other words, the presence of the task activation request is examined in the order of high to low priority levels. Such an examination can be made through retrieval of bits from b6 and b7 of the respective task control words. Bit position b6 is allotted to the activation request flag. When "1" is present at this position b6, it is determined that the activation request is present. Further, b7 is allotted for the flag indicating that the associated task is under execution. The presence of "1" at b7 indicates that the associated task is under execution and is now being interrupted. Accordingly, when "1" is present at least one of b6 and b7, the scheduler program proceeds to the step 538.

At the step 538, the flag set at b7 is checked. The presence of "1" at b7 means that the execution is being interrupted. At a step 540, the execution being interrupted until then is resumed. Flags set at both b6 and b7 cause the decision at the step 538 to be affirmative or YES, whereby the task program being interrupted is re-initiated. In the case where "1" is present only at b6, the activation request flag of the task of the corresponding task level is cleared at the step 542, which is followed by a step 544 where the flag is set at b7 (this flag will be hereinafter referred to as RUN flag). The steps 542 and 544 show that the activation request for the task of the corresponding task level proceeds to the state in which the task is to be executed. Accordingly, at a step 546, the start address of the task program of the task level in concern is retrieved. This address can be determined from a start address table TSA provided in ROM 104 in correspondence to TCWs of the various task levels. By jumping to the start address as determined, the execution of the task program in concern takes place.

Referring again to FIG. 8, when the decision at the step 530 results in NO, this means that neither is an activation request issued to the program of the task level being retrieved nor is the program being momentally interrupted. In this case, the scheduler program proceeds to the retrieval of the task of the next high level. In other words, the task level n is incremented to (n+1). At this time, it is determined whether the incremented level index (n+1) is maximum MAX, i.e. (n+1)=4. If not, the scheduler program proceeds to the step 530. The above processing operation is repeated until n has become equal to MAX or 4, whereupon the interrupted program for the background jobs is resumed at a step 536. In other words, it is confirmed at the step 536 that all the programs for the tasks of levels "0" to "3" are not required to be executed, whereby the processing operation returns to the point of the background job program at which the program has been interrupted in response to the appearance of IRQ.

FIG. 9 illustrates relationship between the task control words TCW and the TTM task start address table representing the task activation time intervals or periods provided in the ROM. In correspondence to the task control words TCW0 to TCW3, there are stored in ROM the task activating periods TTM0 to TTM3. For every INTV IRQ, the counters CNTR or TCW are updated successively and a flag is set at b6 of the associated TCW upon coincidence between contents of the counter and TTM for the task. When the flag is thus set, the start address of the task is retrieved from the task start address TSA. A jump is made to the retrieved start address, whereby the selected one of the programs 1 to 4 is executed. During the execution, a flag is set at b7 of the TCW in RAM 106 which corresponds to the program being executed. Thus, as long as this flag is set, it is decided that the associated program is being executed. In this way, the program for the task scheduler 242 shown in FIG. 5 is executed. As a consequence, one of the task programs 252 to 258 of the task levels "0" to "3" is executed. When IRQ is issued during the execution of any task program, the execution is interrupted again to deal with the IRQ. Assuming that no IRQ is issued, the processing of the task being instantly executed will come to an end. Upon termination of the execution of the task program, the EXIT program 260 is next executed.

Figure 10:
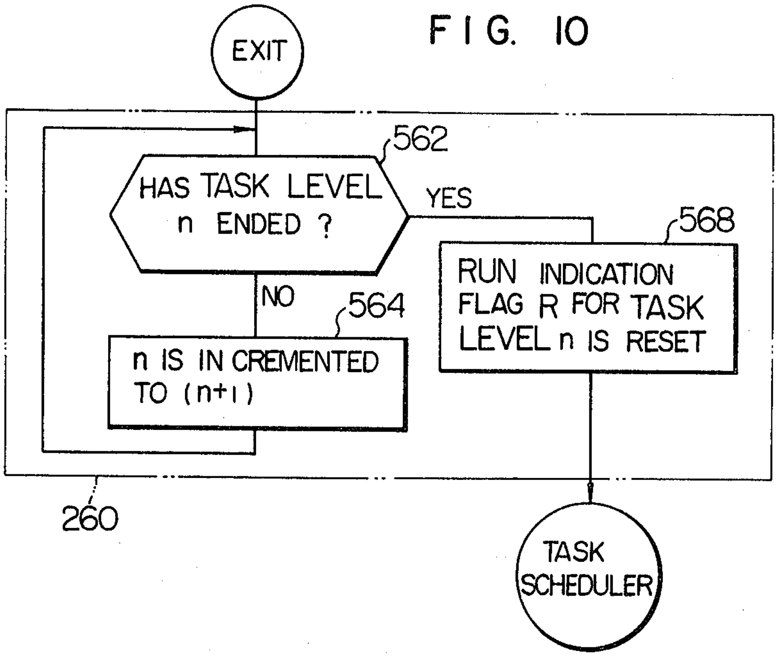
FIG. 10 shows a detailed flow chart of an EXIT program.

The EXIT program 260 is illustrated in detail in FIG. 10. This program is composed of steps 562 and 564 for identifying the ended task. At the steps 562 and 564, retrieval is made successively starting from the task of level "0" to identify the task level of the ended task. At the next step 568, the flag RUN set at b7 of TCW corresponding to the ended task is reset, which means that the program for the identified task has been completely terminated. The processing is taken back again by the task scheduler 242, whereby the program next to be executed is determined.

Figure 11:
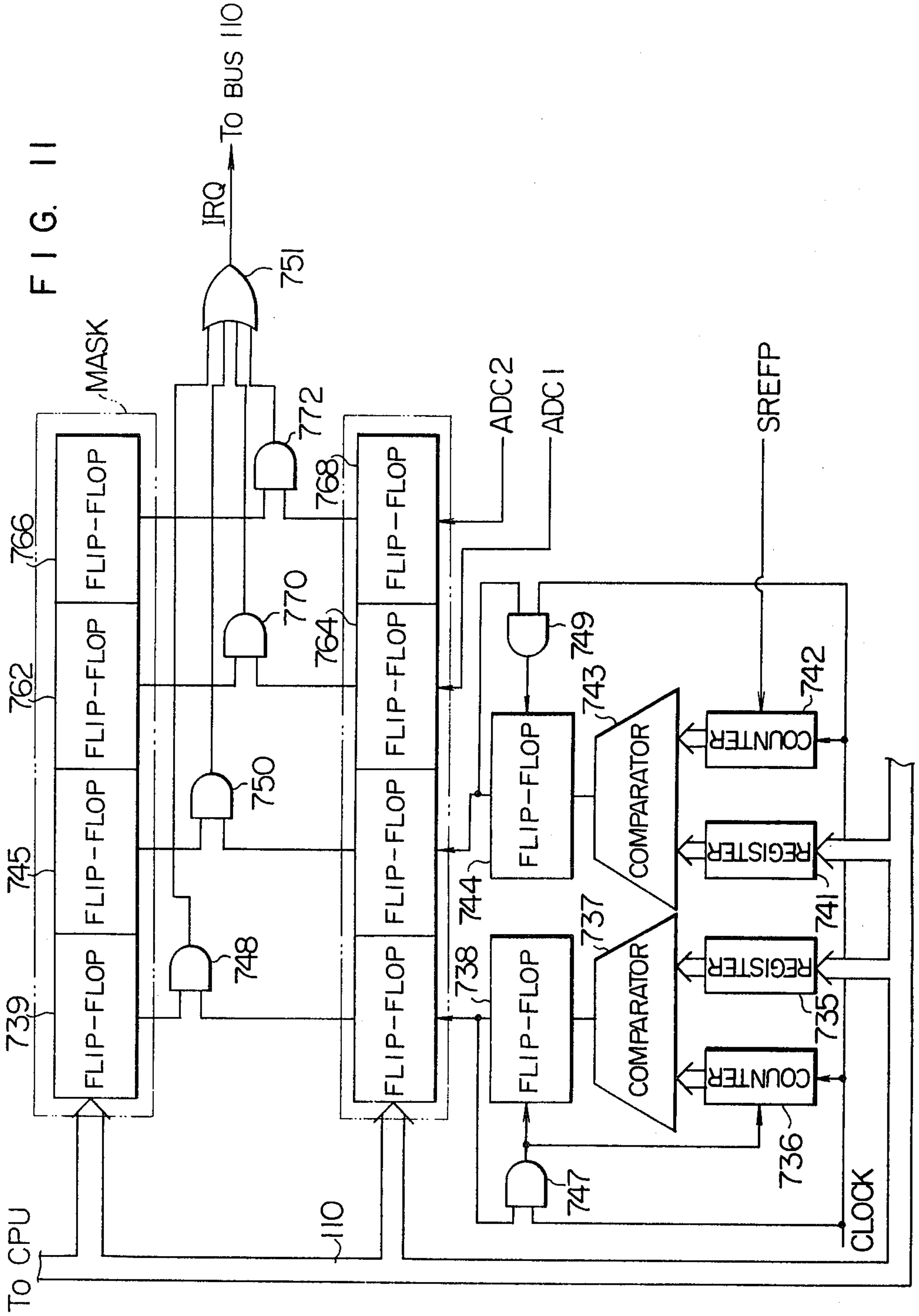
FIG. 11 shows a detailed circuit diagram of an interruption circuit.

FIG. 11 shows the detail of the IRQ circuit shown in FIG. 4. When a condition for requesting the IRQ to the CPU is met, a flag is set at a corresponding bit position of the STATUS register. A condition for requesting a service of the IRQ to the CPU based on the above condition is loaded to the MASK register as described above. The bit positions of the MASK register and the STATUS register are connected to corresponding inputs of AND gates 748, 750, 770 and 772, and the IRQ request signal is issued through an OR gate 751 for the bit position at which the conditions for the MASK register and the STATUS register are met.

The CPU can read the content of the STATUS register via the bus 110. In the steps 502, 504 and 518 shown in FIG. 7, the STATUS is decoded to analyze the cause of the interruption.

The operation for setting a flag indicating the establishment of the condition of IRQ service request to the STATUS register will now be explained. First, in order to examine if the condition of INTV IRQ is met, data indicative of a timer interruption period (for example 10 milliseconds) is set in a register 735 from the CPU via the bus 110. A counter 736 counts the CLOCK pulses and when the count reaches a preset value of the register 735, the output of a comparator 737 changes state. As a result, a flip-flop 738 is set so that the corresponding flag bit of the STATUS register is set.

An AND gate 747 functions to reset the flip-flop 738 and the counter 736. The flip-flop 738 functions to prevent the reset data from being propagated to the counter 736.

A circuit for detecting the stopping of the engine (i.e. the engine rotation speed below a predetermined level) will now be explained. A digit representative of a predetermined time period is loaded to a register 741 from the CPU. On the other hand, a counter 742 counts clock pulses CLOCK. Applied to a reset terminal of the counter 742 are SREFP pulses (to be described in FIG. 29) which are synchronized with the engine crankshaft rotation. While the engine crankshaft rotates, the counter 742 is continuously reset by the SREFP pulses so that the content of the counter 742 does not reach the preset value of the register 741. However, when the engine crankshaft rotation speed decreases significantly, the count of the counter 742 reaches the preset value of the register 741 and an output signal is sent from a comparator 743 to a flip-flop 744 so that a flag is set in the STATUS register. An AND gate 749 functions to reset like the AND gate 747. ADC1END IRQ and ADC2END IRQ also function in the same manner. When the A-D conversion operation of the ADC1 is completed, a "1" is set in a flip-flop 764. When a "1" is set in a flip-flop 762 from the CPU via the bus line 110, the AND condition of an AND gate 770 is met and a service of ACD1END IRQ is requested to the CPU via an OR gate IRQ. However, if "1" is not set in the flip-flop 762, the ADC1END IRQ is inhibited. The same is true for the ADC2. At the end of the ADC2 sequence, a "1" is set in a flip-flop 768. If a "1" has been set in a flip-flop 766, the ADC2END IRQ is issued through an AND gate 772 and an OR gate 751, but if the "1" has not been set in the flip-flop 766, the AND condition of the AND gate 772 is not met and the ADC2END IRQ is not issued. Thus, the IRQ is issued if the "1" is set in the flip-flop 739, 745, 762 or 766, and if a "0" is set the issuance of the IRQ is inhibited.

Figure 12:
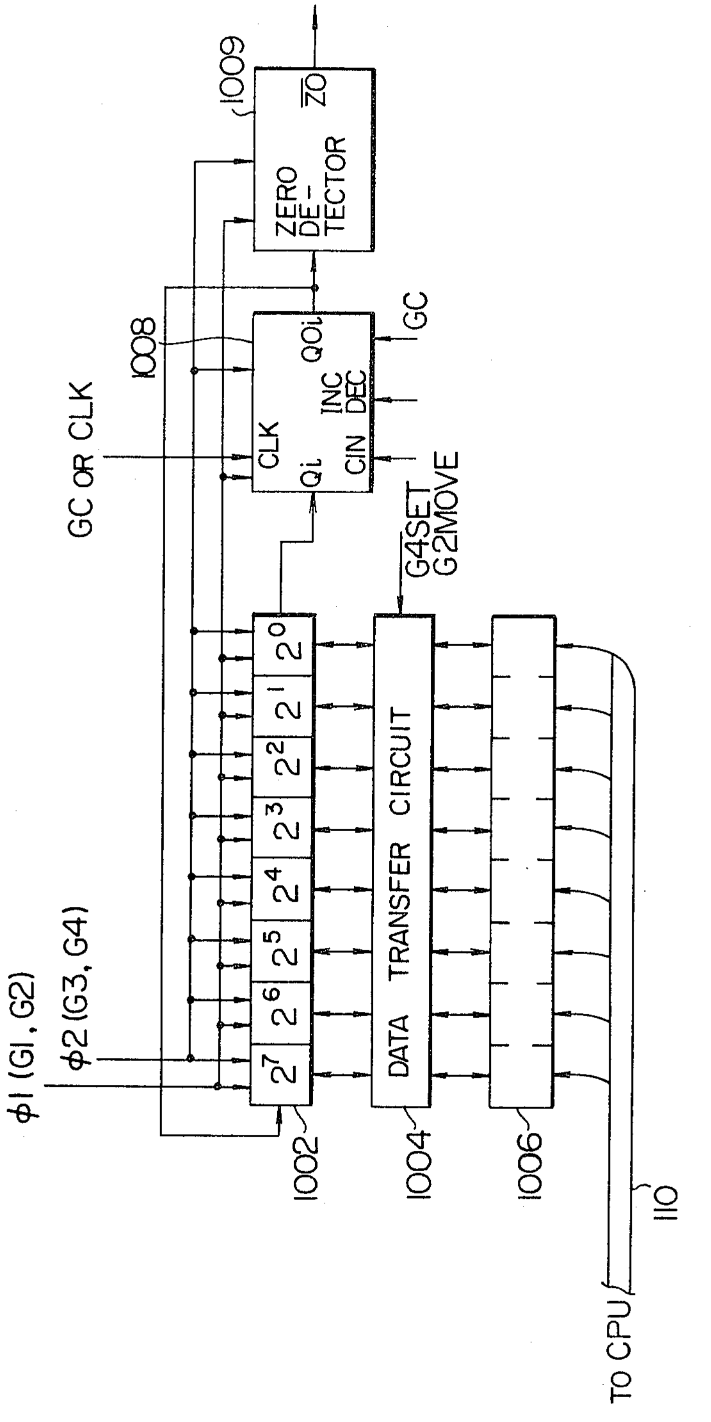
FIG. 12 shows a basic circuit diagram of a pulse converter circuit.

FIG. 12 is a block diagram showing the principle of operation of output pulses of the registers CABD and CABP which constitute the CABC 162 shown in FIG. 4, the registers ADV and DWL of the IGNC 164, the registers FSCD AND FSCP of the FSC 172, the registers EGRD and EGRP of the EGRC 178, the INTV IRQ circuit comprising the register 735, the counter 736 and the comparator 737 shown in FIG. 11, or the ENST IRQ circuit comprising the register 741, the counter 742 and the comparator 743. Clocks G1, G2, G3 and G4 which are produced by two-phase clocks $\phi 1$ and $\phi 2$ common to the clocks for driving the CPU are applied to a shift register 1002. Each of latch circuits forming the respective bit positions of the register 1002 comprises a master-slave flip-flop. The latch circuits carry out the shift operations by the four-phase clocks G1, G2, G3 and G4. In the present embodiment, the shift register 1002 is an 8-bit register and driven by the four-phase clocks, but the number of bit positions may change depending on the precision of control and it may be sixteen. The clocks may be two-phase clocks or multi-phase clocks.

An 8-bit latch register 1006 can read and write data from and to the CPU via the bus line 110 by an interface circuit contained in the CPU. A data transfer circuit 1004 responds to a control signal G4SET or G2MOVE to transfer data between the latch register 1006 and the shift register 1002. An increment/decrement circuit 1008 processes a carry. A zero detection circuit 1009 detects the all-zero condition of the shift register 1002 by monitoring the output of the increment/decrement circuit 1008. The increment/decrement circuit 1008 receives one-bit data from the $2^0$ bit latch circuit of the shift register 1002, processes the carry and provides one-bit data to the $2^7$ bit latch circuit of the shift register 1002.

The operations of the shift register 1002 and the increment/decrement circuit 1008 will now be explained in detail. The data Qo of the $2^0$ bit latch circuit of the shift register 1002 is applied to the increment/decrement circuit 1008 which now functions as a decrementer. Assuming that the data initially loaded into the shaft register 1002 is "10001100", the "0" at the $2^0$ bit position is applied as the Qo. When the increment/decrement circuit 1008 is to function as a decrementer, "1's" are applied to input terminals DEC and CIN. When a "0" is applied to the input terminal CIN, the increment/decrement circuit 1008 neither increments nor decrements but sends out input data as it is. Let us assume that "1" is applied to the terminal CIN. The increment/decrement circuit 1008 produces a first output signal QOo in accordance with the following Boolean equation:

$$QOo = Qo \oplus CIN \quad (1)$$

where Qo=0, CIN=1 in the present instance and $\oplus$ represents an Exclusive OR function of the two inputs Qo and CIN. Accordingly, we get QOo=1.

A first carry Co is determined in accordance with the following Boolean equation:

$$Co = \overline{Qo} \cdot CIN \quad (2)$$

Since Qo=0, $\overline{Qo}$=1, and CIN=1. Accordingly we get Co=1.

Through the above operation, "1" is sent from the output terminal QOi to the $2^7$ bit latch circuit of the shift register 1002 and the content of the shift register 1002 now becomes "11000110". At the next clock, the "0" which is the second bit signal of the initial data "10001100" is applied from the $2^0$ latch circuit of the shift register 1002 to the Qi input terminal of the increment/decrement circuit 1008 as the Q1 signal. The output terminal QOi of the increment/decrement circuit 1008 thus produces a signal QOi which is represented by the following Boolean equation:

$$QO1 = Q1 \oplus Co \quad (3)$$

Since Q1=0 and Co=1, we get QO1=1. The content of Co is a carry processed at the previous bit position and it has been held in the increment/decrement circuit 1008. The increment/decrement circuit 1008 processes the output QO1 as well as the carry. A carry C1 is represented by the following Boolean Equation:

$$C1 = \overline{Q1} \cdot Co \quad (4)$$

Since Q1=1 and Co=1, we get C1=1. Thus, the "1" is held as a carry in the increment/decrement circuit 1008. Since the increment/decrement circuit 1008 produces the "1", the content of the shift register 1002 now changes to "11100011".

At the third clock, the "1" is applied to the increment/decrement circuit 1008 as the Q2 intput signal. The output Q2 now becomes:

$$QO2 = Q2 \oplus C1 \quad (5)$$

Since Q2=1 and C1=1, we get QO2=0. The carry C2 becomes:

$$C2 = \overline{Q2} \cdot C1 \quad (6)$$

Since $\overline{Q2}$=0 and C1=1, we get C2=0. Accordingly, the "0" is held as the carry and the content of the shift register 1002 changes to "01110001".

As is seen from the above operation, the Boolean equations of the outputs of the increment/decrement circuit 1008 are represented by the following equations:

$$\text{First output } QOo = Qo \oplus CIN \quad (7)$$

Second and subsequent output $$QOi = Qi \oplus C(i-1) \quad (8)$$

where Qo is the first input from the shift register 1002 to the increment/decrement circuit 1008. The CIN and DEC are control inputs for the decrement function. When the CIN and DEC inputs are "1", the increment/decrement circuit 1008 decrements, and when the CIN input is "0" it sends out the input signal without decrementing.

The carries held in the increment/decrement circuit 1008 are represented by the following equations.

First carry $Co=\overline{Qo}\cdot CIN$ (9)

Second and subsequent carry $Ci=\overline{Qi}\cdot C(i-1)$ (10)

The Qi is the i-th input to the increment/decrement circuit 1008 and the C(i−1) is a carry determined in the previous cycle and held in the increment/decrement circuit 1008.

As seen from the equations (7) to (10), at the fourth clock the content of the shift register changes to "10111000", at the fifth clock it changes to "01011100", at the sixth clock it changes to "00101110", at the seventh clock it changes to "00010111", and at the eighth clock it changes to "10001011". As is seen from the above, after eight four-phase clocks produced by $\phi 1$ and $\phi 2$ have been applied, the initial content "10001100" is reduced to "10001011". Thus, after the clocks which are equal in number to the number of bits of the shift register 1002 have been sent, the content of the shift register 1002 is reduced by one for the decrement function and increased by one for the increment function.

Figure 13A:
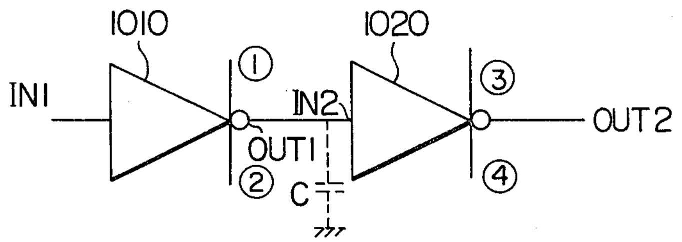
FIGS. 13A and 13B show a basic element which constitutes the basic circuit of FIG. 12.
Figure 13B:
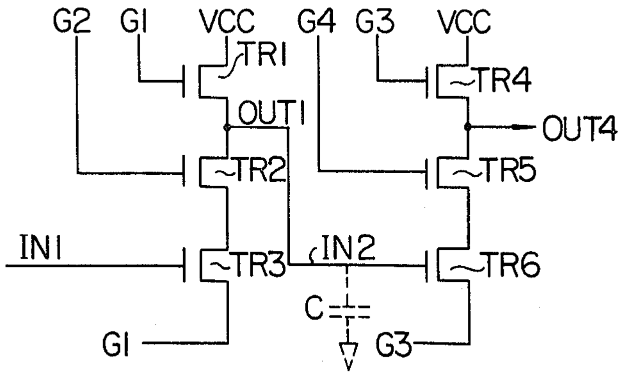
Figure 14:
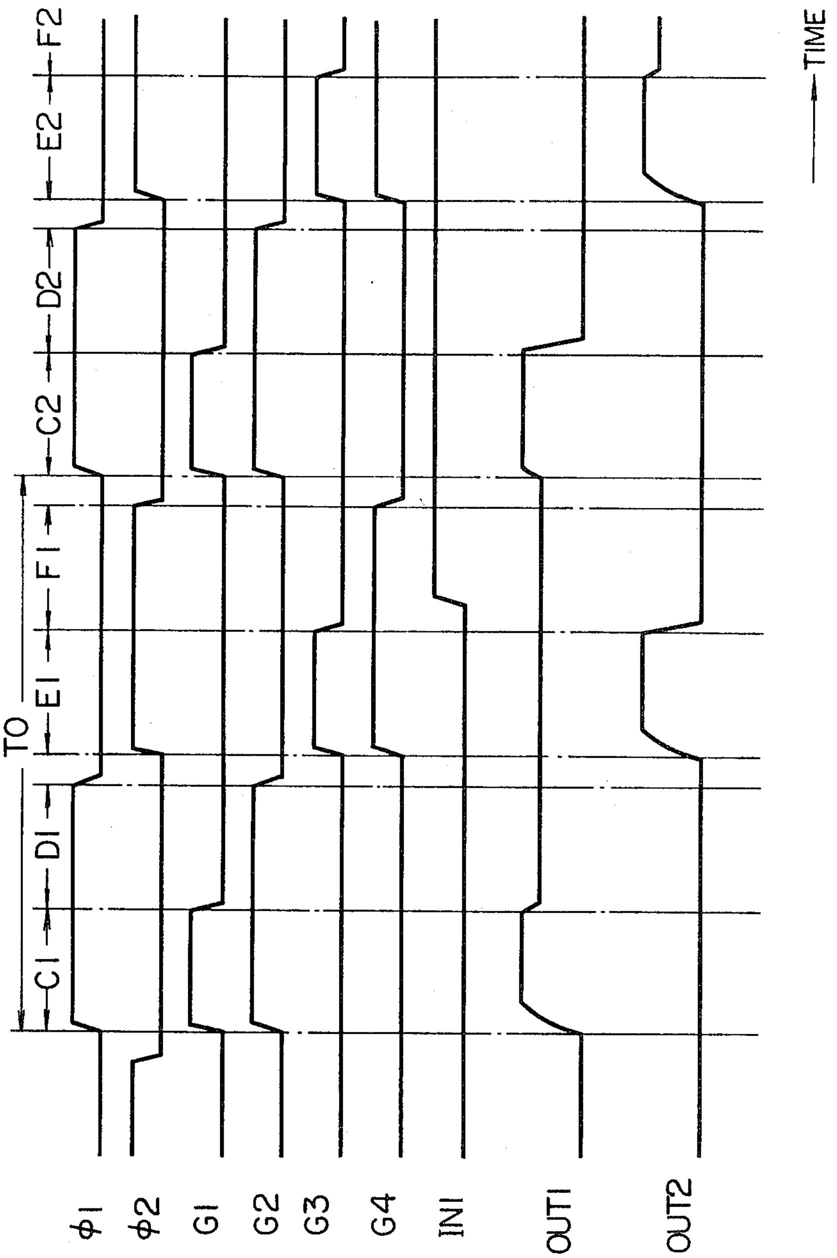
FIG. 14 illustrates the operation of FIG. 13, FIGS. 15A and 15B show another basic element which constitutes the basic circuit of FIG. 12.

Referring to FIGS. 13A, 13B and 14, basic circuits of the shift register 1002, the increment/decrement circuit 1008, the latch register 1006 and the transfer circuit 1004 will be explained. FIG. 13A shows a one-bit shift circuit comprising dynamic inverters 1010 and 1012. Symbols ① and ② of the inverter 1010 indicate that the inverter 1010 is driven by clocks G1 and G2, and symbols ③ and ④ of the inverter 1012 indicate that the inverter 1012 is driven by clocks G3 and G4. FIG. 13B shows a MOS representation of the circuit of FIG. 13A. The operation of FIG. 13B is explained with reference to operational waveforms shown in FIG. 14. First, four-phase clocks G1 to G4 are produced based on the clocks $\phi 1$ and $\phi 2$. In a time slot C1, G1=1 and G2=1 and transistors TR1 and TR2 are turned ON. However, a transistor TR3 is OFF because a gate-source voltage of the TR3 does not reach a threshold voltage. Thus, an external load such as a distributed capacitance C connected to an output terminal OUT1 of the inverter 1010 is precharged. In the next time slot D1, G1=0 and G2=1 so that the transistor TR1 is OFF and the transistor TR2 is ON. The transistor TR3 remains OFF because IN1 is "0". Thus, the distributed capacitance C retains the charge which was precharged by $V_{cc}$ (power supply voltage). As a consequence, the inverter 1010 produces the output OUT1=1 for the input IN1=0.

In the time slot E1, G3 and G4 are "1" and the transistors TR4 and TR5 are turned ON. The transistor TR6 remains OFF because the input IN2 and G3 are "1". Thus, the distributed capacitance connected to the output OUT2 of the inverter 1012 is precharged by the power supply voltage $V_{cc}$ through the transistor TR4. In the time slot F1, a logical operation is carried out. Since G3=0, G4=1 and IN2=1, the transistor TR4 is off and the transistors TR5 and TR6 are ON and the precharged charge of the distributed capacitance connected to the output OUT2 is discharged through the transistors TR5 and TR6. As a result, the OUT2 produces a "0" output.

Figure 15A:
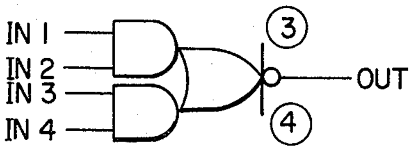
Figure 15B:
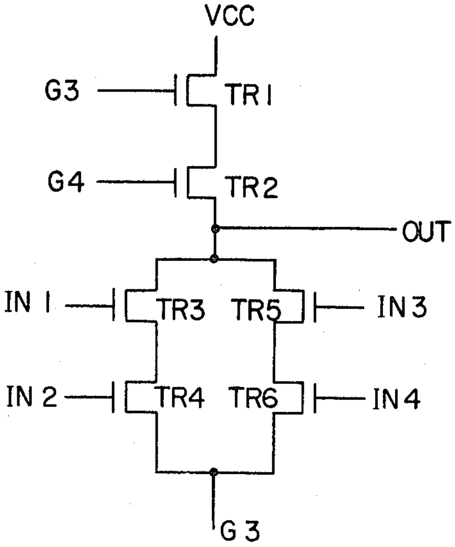

FIG. 15A shows another basic circuit, and a MOS representation thereof is shown in FIG. 15B. The operation of the circuit is basically same as that of the circuit of FIG. 13. First, the transistors TR1 and TR2 are turned ON by the clocks G3 and G4 and the stray capacitance connected to the terminal OUT is precharged. Then, a logical operation is carried out by the logic circuit comprising the transistors TR3, TR4, TR5 and TR6. The transistors TR3 and TR4 and the transistors TR5 and TR6 are connected in series, respectively, to form AND gates. The series circuits are connected in parallel to form an NOR gate.

Figure 16:
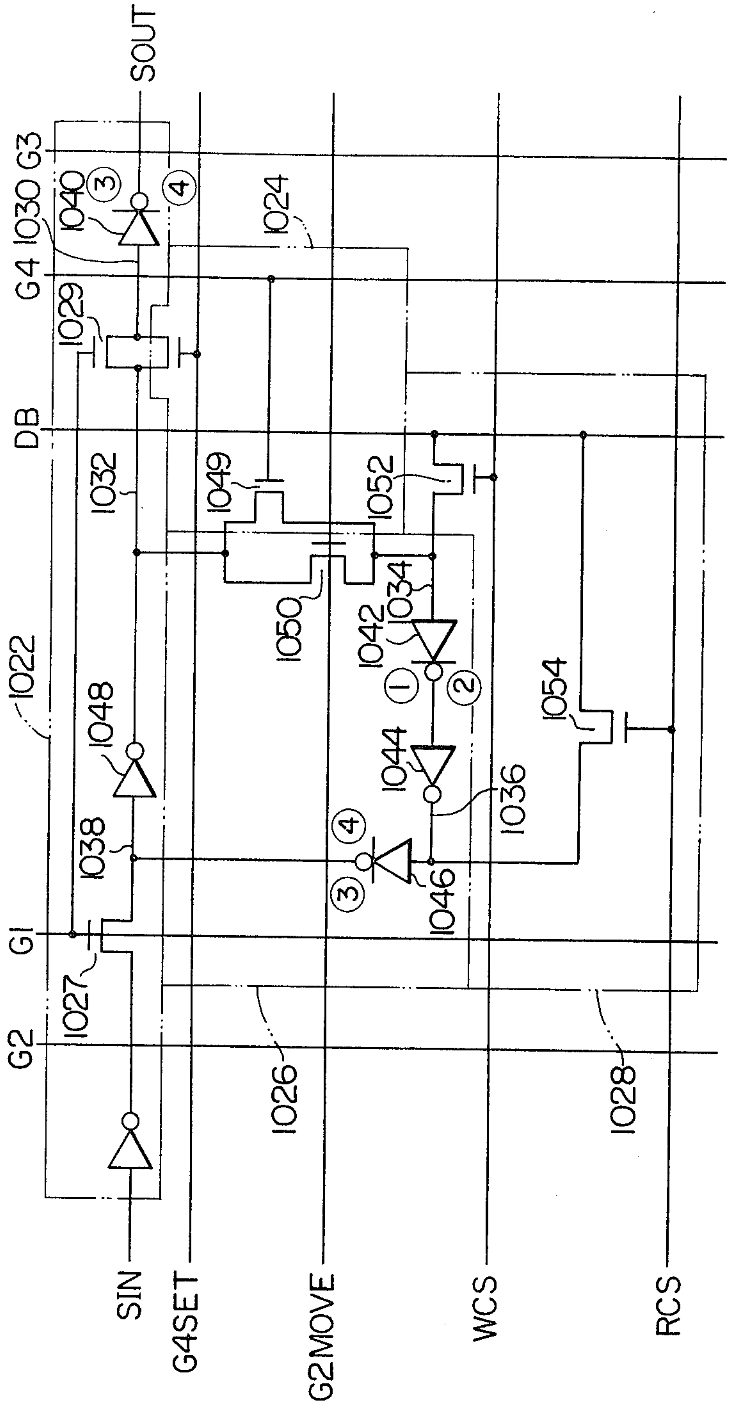
FIG. 16 shows a detailed MOS diagram of a shift register, a latch register and etc. shown in FIG. 12, FIGS. 17A and 17B illustrate the operation of the shift register.

FIG. 16 shows one bit of the shift register, data transfer circuit and latch register shown in FIG. 12. A block 1022 is a one-bit shift register, a block 1024 is a one-bit data transfer circuit, a block 1026 is a one-bit latch circuit and a block 1028 is a one-bit interface circuit between the latch circuit 1026 and the data bus. The circuit of FIG. 12 comprises eight such circuits of FIG. 16 connected in series.

Figure 17A:
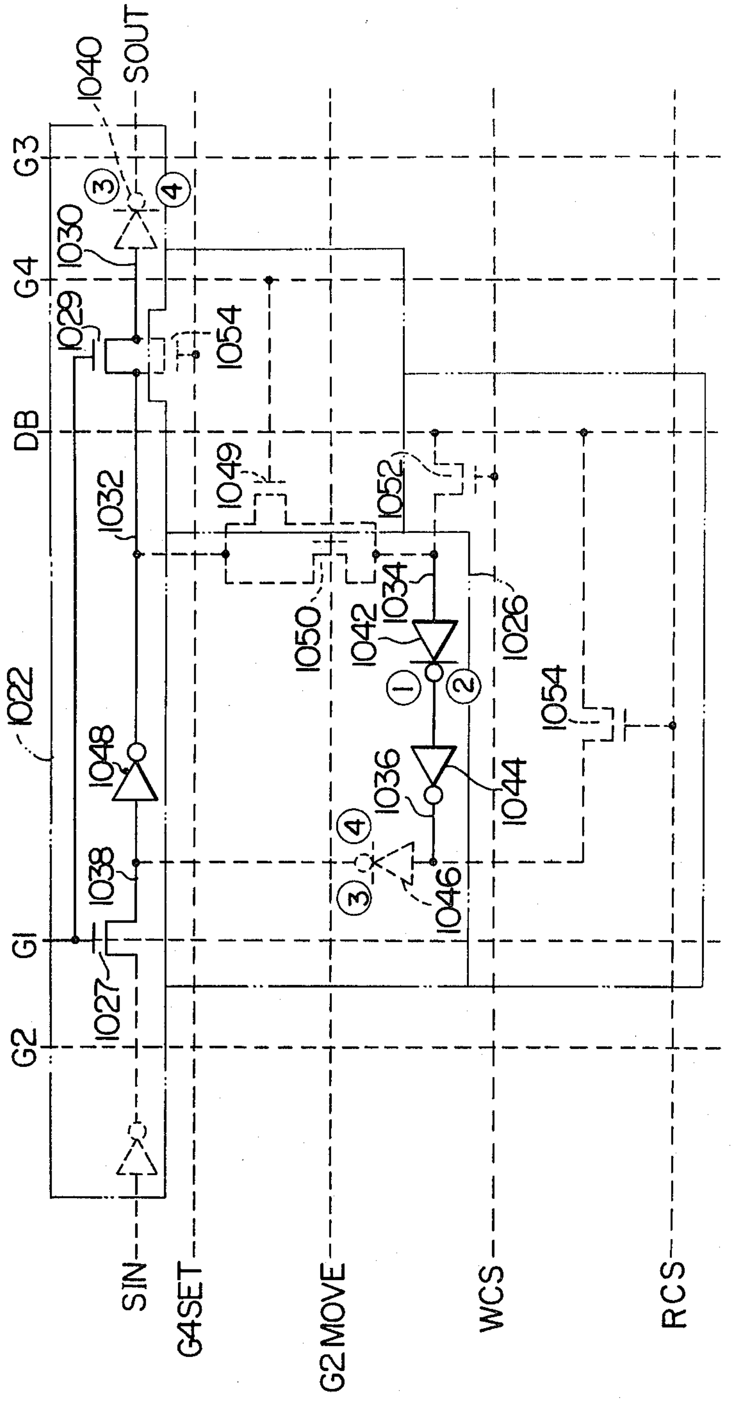

Referring to FIG. 17A, the one-bit shift circuit will be explained. At the timing of the clock G1="1", the portions of the circuit of FIG. 17A shown by solid lines are active and the portions shown by broken lines are inactive. Transistors 1027 and 1029 are turned ON and an input signal SIN is transmitted to a signal line 1030 through the transistors 1027 and 1029 and an inverter 1048. A capacitance present on the signal line 1030 is charged so that the input SIN is held on the signal line 1030.

Figure 17B:
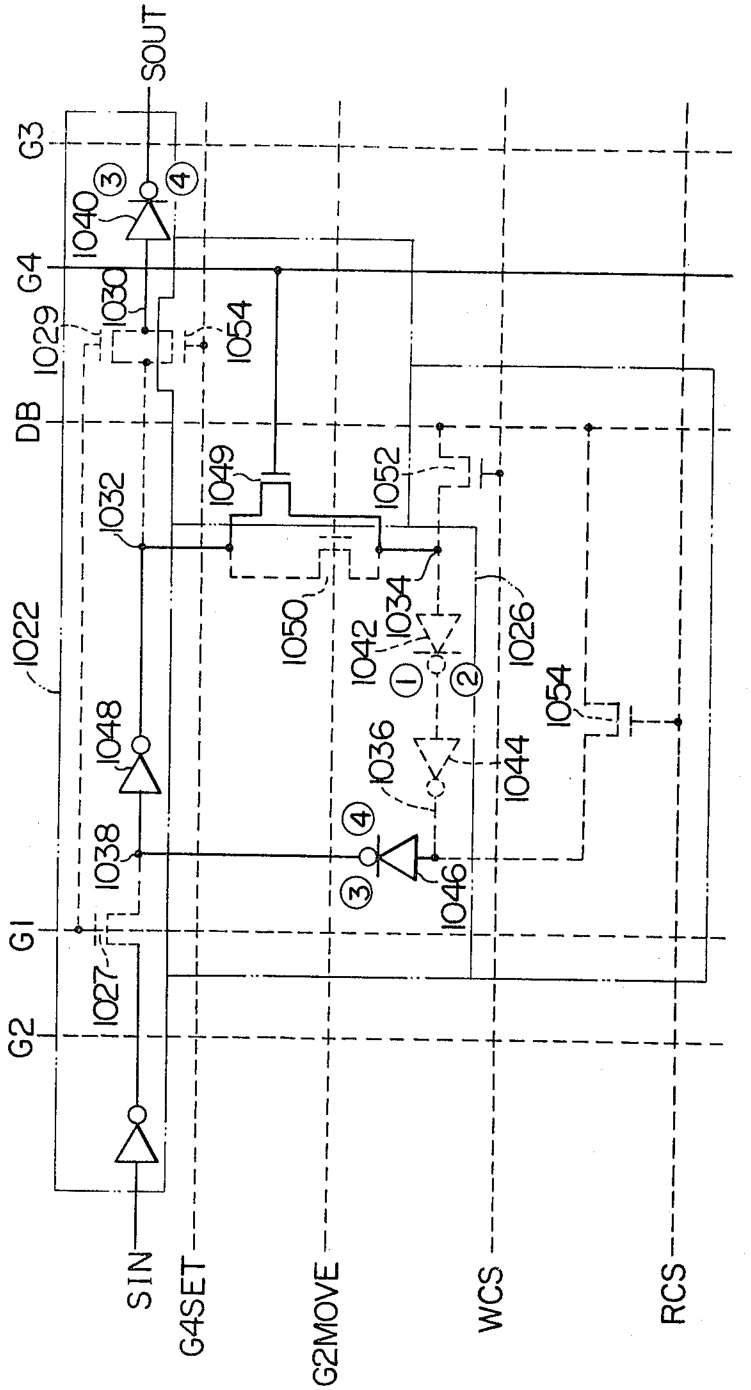

At the timing of G1=0, the transistors 1027 and 1029 are turned OFF and the signal lines 1032 and 1030 are isolated from each other. In this time slot, inverters 1042 and 1044 of the latch circuit to be described hereinafter are also active. A circuit which is active at the clocks G3 and G4 following the clocks G1 and G2 is shown in FIG. 17B. The signal held on the signal line 1030 is transmitted to the output SOUT in synchronism with the fall of the clock G3 as explained previously with reference to in FIG. 13. Thus, at the clocks G1 and G2, the data at the input SIN is held on the signal line 1030, and at the clocks G3 and G4 it is sent out from the inverter 1040. In this manner, the input SIN is sent out as the output SOUT in synchronism with the timing of the clocks G1, G2, G3 and G4 and one bit of shift operation is completed. By the repetition of the clocks G1 to G4, the shift register repeats the shift operation. When the 8-bit shift register is constructed by the series connection of the eight one-bit shift registers as shown in FIG. 12, the shift operations are carried out by the clocks G1 to G4 applied to the respective one-bit shift registers. After eight sets of clocks G1 to G4 have been applied, the 8-bit data stored is shifted one revolution through the shift register.

The operation of the latch circuit 1026 will be explained with reference to FIGS. 17A and 17B. As shown by the solid lines in FIG. 17A, the data held on the signal line 1034 is stored on the signal line 1036 via a dynamic inverter 1042 and an inverter 1044 at the clocks G1 and G2. At the clocks G3 and G4, the data stored on the signal line 1036 is transferred to a transistor 1049 through a dynamic inverter 1046 and an inverter 1048 as shown in FIG. 17B. Since the transistor 1049 is turned ON at the clock G4, the data transferred from the signal line 1036 to the transistor 1049 is further transferred to the signal line 1034. Since the transistors 1027 and 1029 are OFF at the timing of the clocks G3 and G4, the series circuit of the signal line 1038, the inverter 1048 and the signal line 1032 is isolated from the input and output of the one-bit shift circuit 1022 so that it functions as a part of the latch circuit 1026. This series circuit is shared by the one-bit shift circuit and the latch circuit such that the input data SIN of the shift circuit passes through the series circuit at the clocks G1 and G2 while the data of the latch circuit passes through the series circuit at the clocks G3 and G4. The data on the signal line 1034 is sent to the signal line 1036 at clocks G1 and G2, and the data on the signal line 1036 is again sent back to the signal line 1034 at the clocks G3 and G4. In this manner, the data is held by circulating through the closed loop latch circuit by the clocks G1 and G4.

Figure 18:
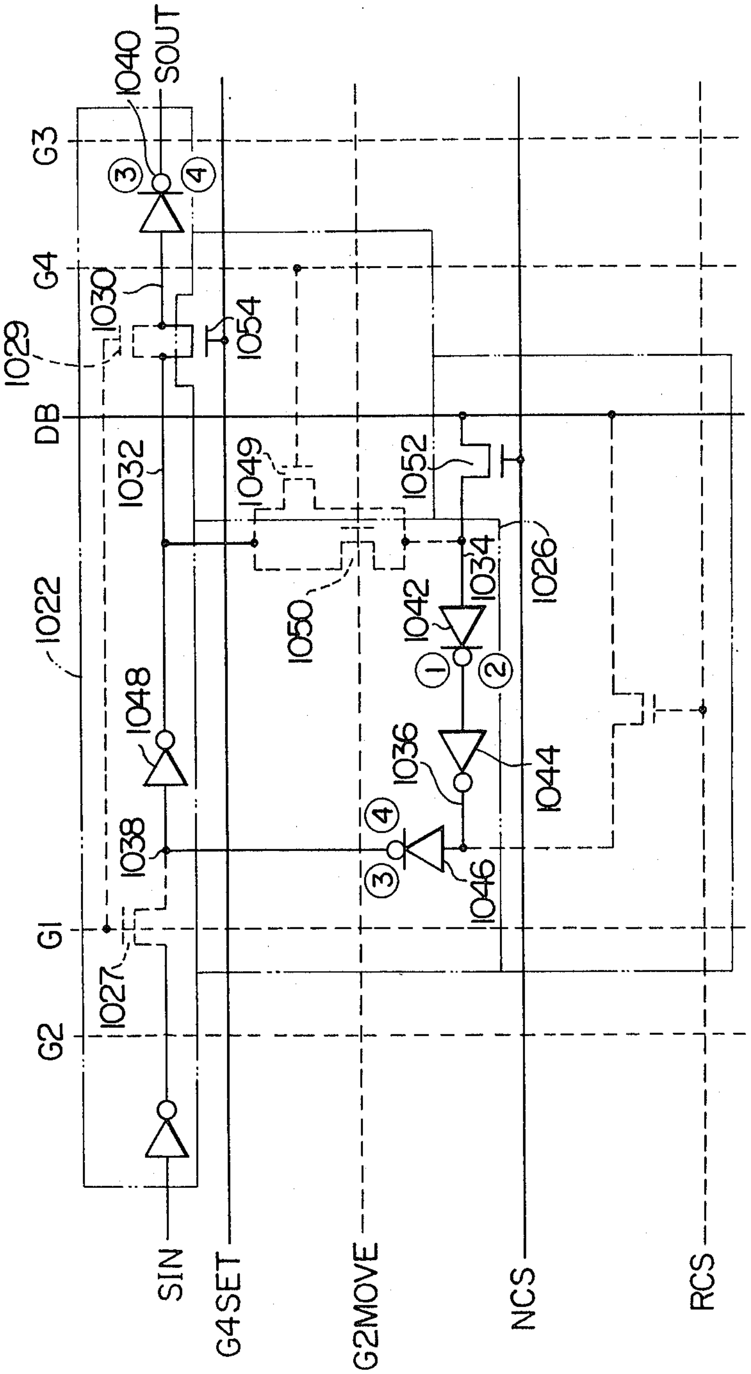
FIG. 18 shows a detailed diagram of a data write circuit.
Figure 19:
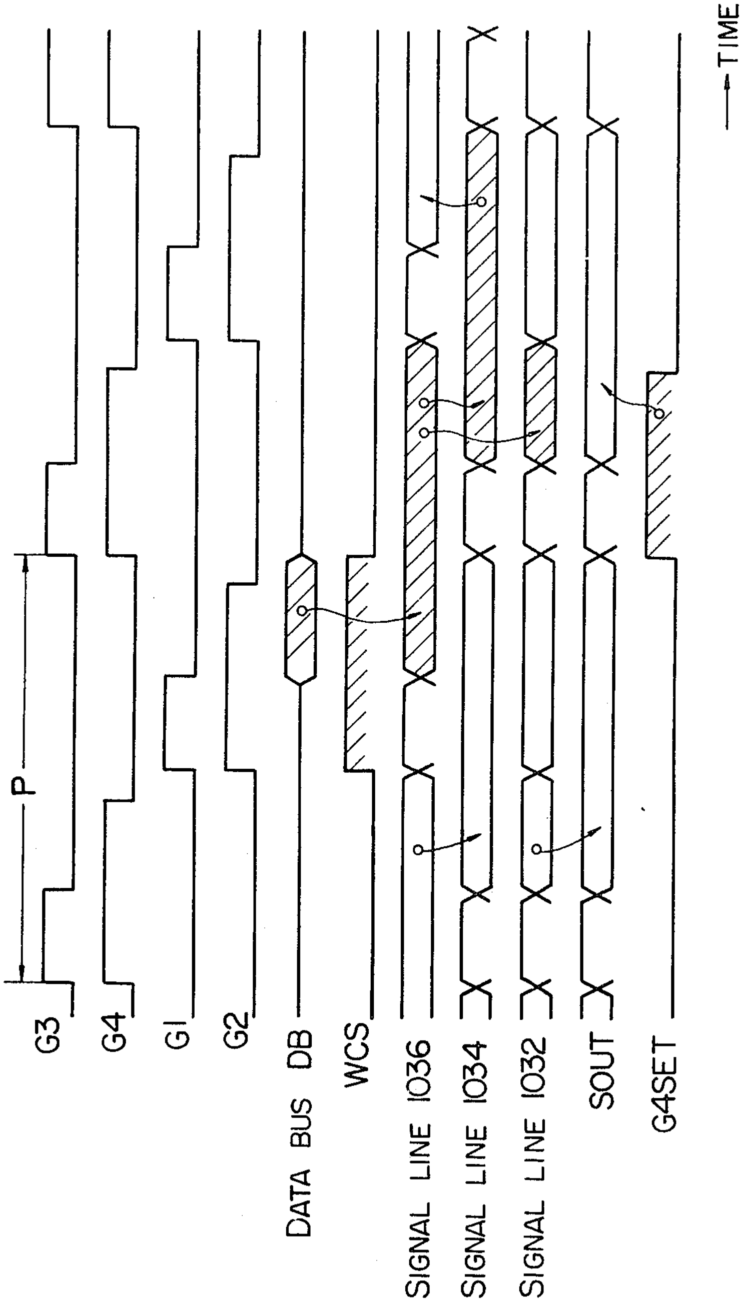
FIG. 19 illustrates the operation of FIG. 18.

The data write operation from the CPU through the bus line will now be explained. A circuit portion of the circuit of FIG. 12 which relates to the data set operation is shown by solid lines in FIG. 18 and the operation thereof is illustrated in FIG. 19. A signal on a control line WCS (write chip select) comprises address data sent from the CPU via the address bus and a control signal sent via the control bus and it functions to control the interface between the latch circuit and the one-bit line which constitutes the data bus DB. The signal on the signal line WCS is synchronized with the rising edges of the clocks G2 and G4. A signal on a control line G4SET functions to transfer data from the latch circuit to the shift circuit.

When the signal representative of the data-write is transferred from the CPU via the control bus or the address bus, the signal on the signal line WCS assumes "1". This time slot is shown by P in FIG. 19. In this time slot, the write data is carried on the line DB which constitutes the data bus and it is transferred to the signal line 1034 through the transistor 1052. At the clocks G1 and G2, the signal on the signal line 1034 is transferred to the signal line 1036 via the dynamic inverter 1042 and the inverter 1044. In this manner, the data on the data bus DB is transferred to the latch circuit through the transistor 1052.

In order to transfer the data to the shift circuit, the signal G4SET is generated when the signal on the data bus DB is transferred to the signal line 1038 of the latch circuit to turn ON the transistor 1054 which in turn allows to transfer the data to the signal line 1030, and the data is shifted to the output SOUT at the clocks G3 and G4.

Figure 20:
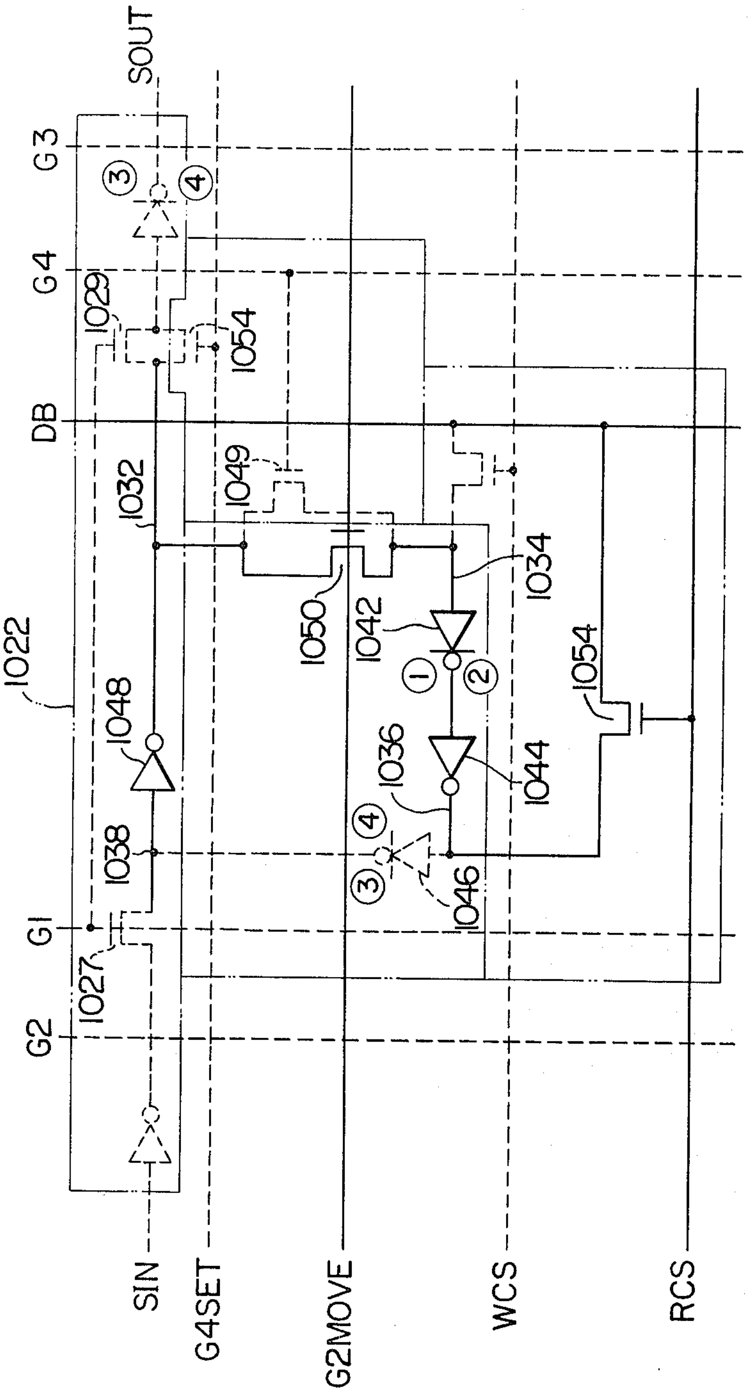
FIG. 20 shows a detailed diagram of a data read circuit.
Figure 21:
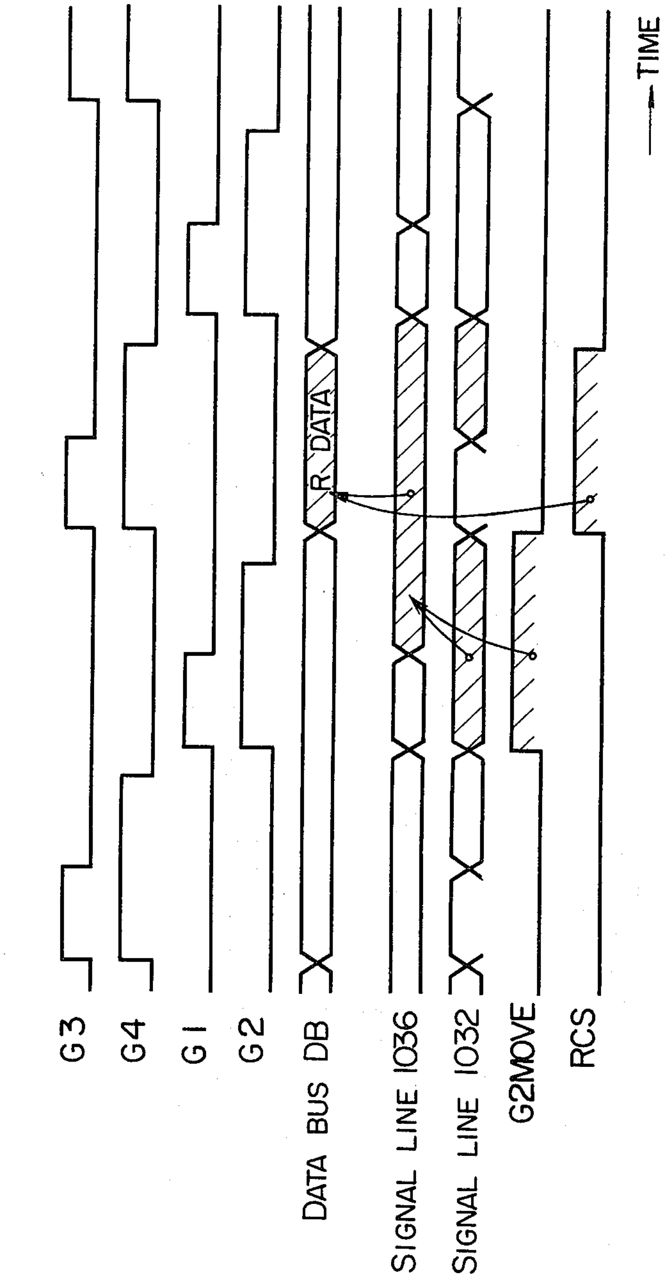
FIG. 21 illustrates the operation of the data read operation.

Referring to FIGS. 19 and 20, the data read operation of the circuit of FIG. 12 will be explained. The signal of the shift register is held on the signal line 1032 of the shift circuit because the transistors 1027 and 1029 are turned ON at the clock G1. In response to a signal G2MOVE, the signal on the line 1032 is transferred to the signal line 1034 via the transistor 1050 and it is further transferred to the signal line 1036 at the clocks G1 and G2. When a signal RCS (read chip select) which is produced by the signals sent from the CPU via the control bus and the address bus is issued, the transistor 1054 is turned ON and the signal held on the signal line 1036 is transferred to the data bus DB. In this manner, the signal of the shift circuit is read out. When several circuits of FIG. 12 are to be arranged in parallel, the circuits of FIG. 16, which are basic cells, are arranged regularly in a matrix and the clocks G1 to G4, the data buses DB0 to DB7 and the signal lines G2MOVE, G4SET, WCS and BCS are regularly wired by aluminum conductors.

Figure 22A:
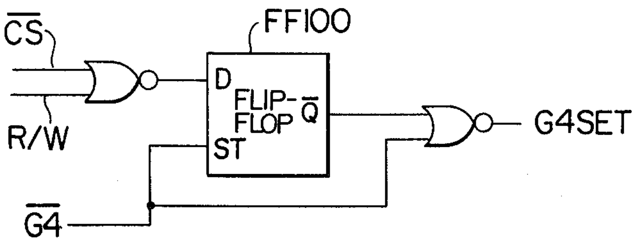
FIGS. 22A and 22B show circuits for generating signals for reading and writing data.
Figure 22B:
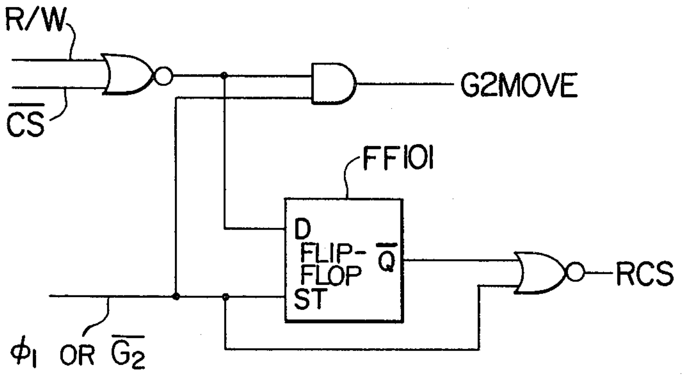
Figure 23:
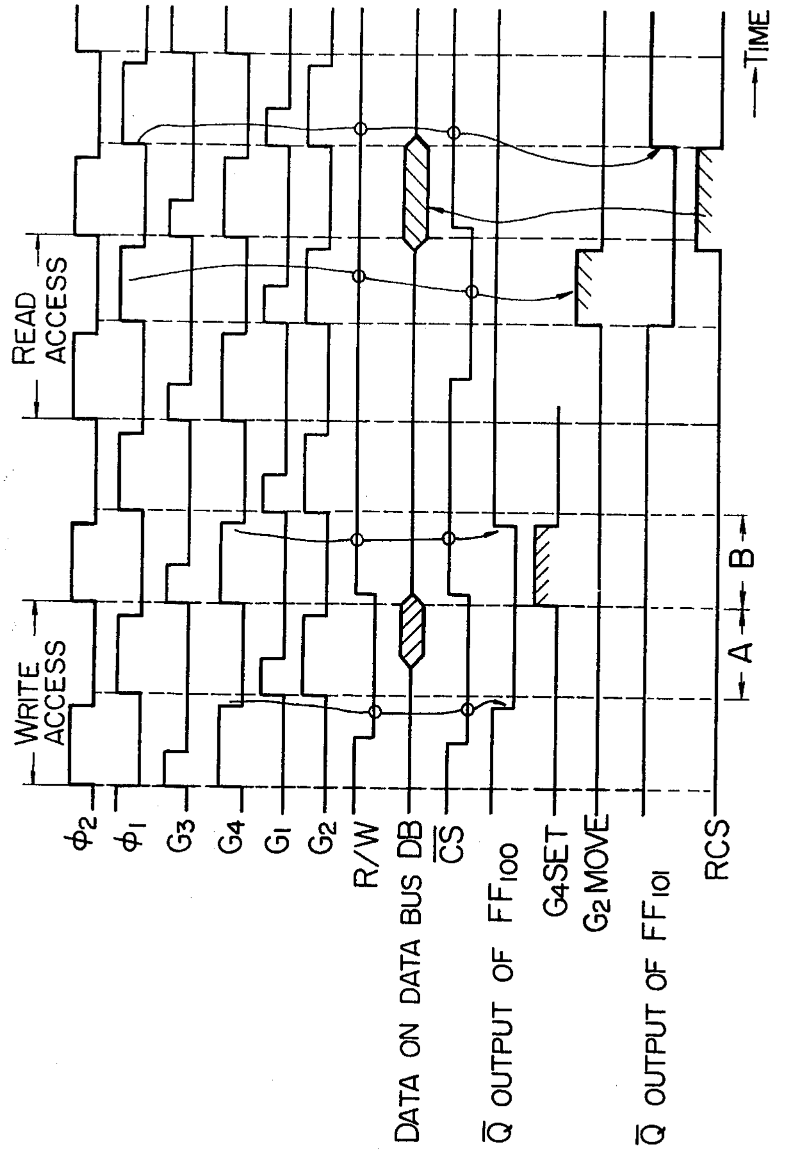
FIG. 23 shows a time chart for explaining the operation of the circuits of FIGS. 22A and 22B.

Circuits for generating the signals G4SET, G2MOVE and RCS are shown in FIGS. 22A and 22B and the operations thereof are illustrated in FIG. 23. FIG. 22A shows the circuit for generating the signal G4SET for the write access. A read/write signal R/W may be a signal produced by a M-6800 microcomputer which is used in a preferred embodiment of the present invention. A low-level of the read/write signal indicates the write access while a high-level indicates the read access. A symbol $\overline{CS}$ represents a normally-high (negative logic) chip select signal and FF100 represents a D-type flip-flop. The flip-flop FF100 latches (sets) the D-input applied at the trigger timing of $\overline{G4}$ which is applied to a strobe input ST. Namely, it sets the D-input at the timing of the rising edge of $\overline{G4}$ and the signal G4SET is determined by the set condition. Applied to the D-input is a NOR function of $\overline{CS}$ and R/W from an output of a NOR circuit. Namely, a $\overline{Q}$ output of the flip-flop FF100 is determined by the signals R/W and $\overline{CS}$ at the timing of the rising edge of $\overline{G4}$. In a time slot A in FIG. 23, the output of the NOR gate is "1" since both of the signals $\overline{CS}$ and R/W are "0". Thus, the $\overline{Q}$ output of the flip-flop becomes "0" at the rising edge of the clock $\overline{G4}$. Next, in a time slot B, the output of the NOR gate is "0" since both of the signals $\overline{CS}$ and R/W are "1". Thus, the $\overline{Q}$ output of the flip-flop becomes "1" at the rising edge of the clock $\overline{G4}$. The state of the signal G4SET is determined by the states of the $\overline{Q}$ output and the clock $\overline{G4}$ through the NOR gate.

FIG. 22B shows a circuit for generating the signal G2MOVE for the read acess and the signal RCS. Signals $\overline{R/W}$ and $\overline{CS}$ are applied to one input of an AND gate and a D-input of a flip-flop FF101 and through a NOR gate. The clock $\phi_1$ is applied to the other input of the AND gate and an ST-input of the flip-flop FF101. A $\overline{Q}$-output of the flip-flop FF101 is applied to a NOR gate together with $\phi_1$ and the NOR gate produces the output RCS. Thus, the state of the signal G2MOVE is determined by the states of the signal $\overline{R/W}$, $\overline{CS}$ and $\phi_1$. Further, the state of the $\overline{Q}$ output of the flip-flop FF101 is determined by the states $\overline{R/W}$ and $\overline{CS}$ at the rising edge of $\phi_1$ (or $G_2$). The state of the signal RCS is determined by the $\overline{Q}$ output and the clock $\phi_1$.

Figure 24:
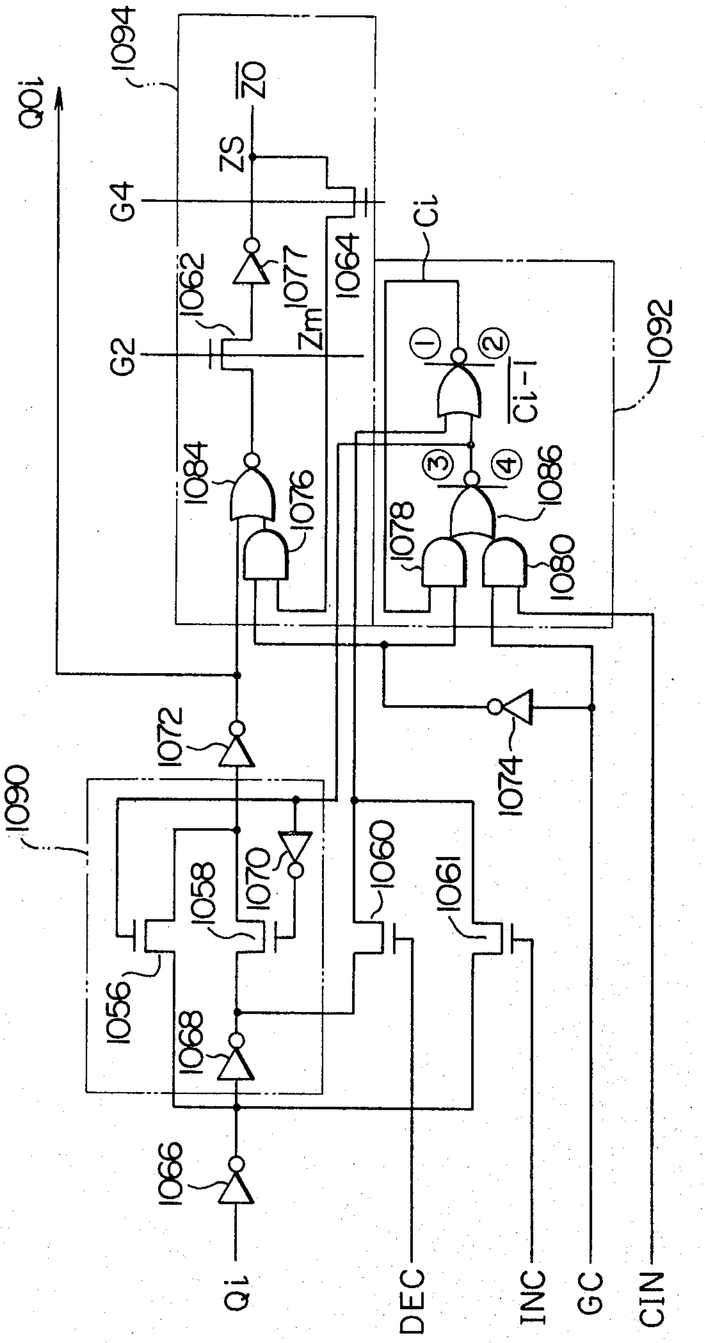
FIG. 24 shows a detailed diagram of an increment-/decrement circuit and a zero detection circuit shown in FIG. 12.
Figure 25:
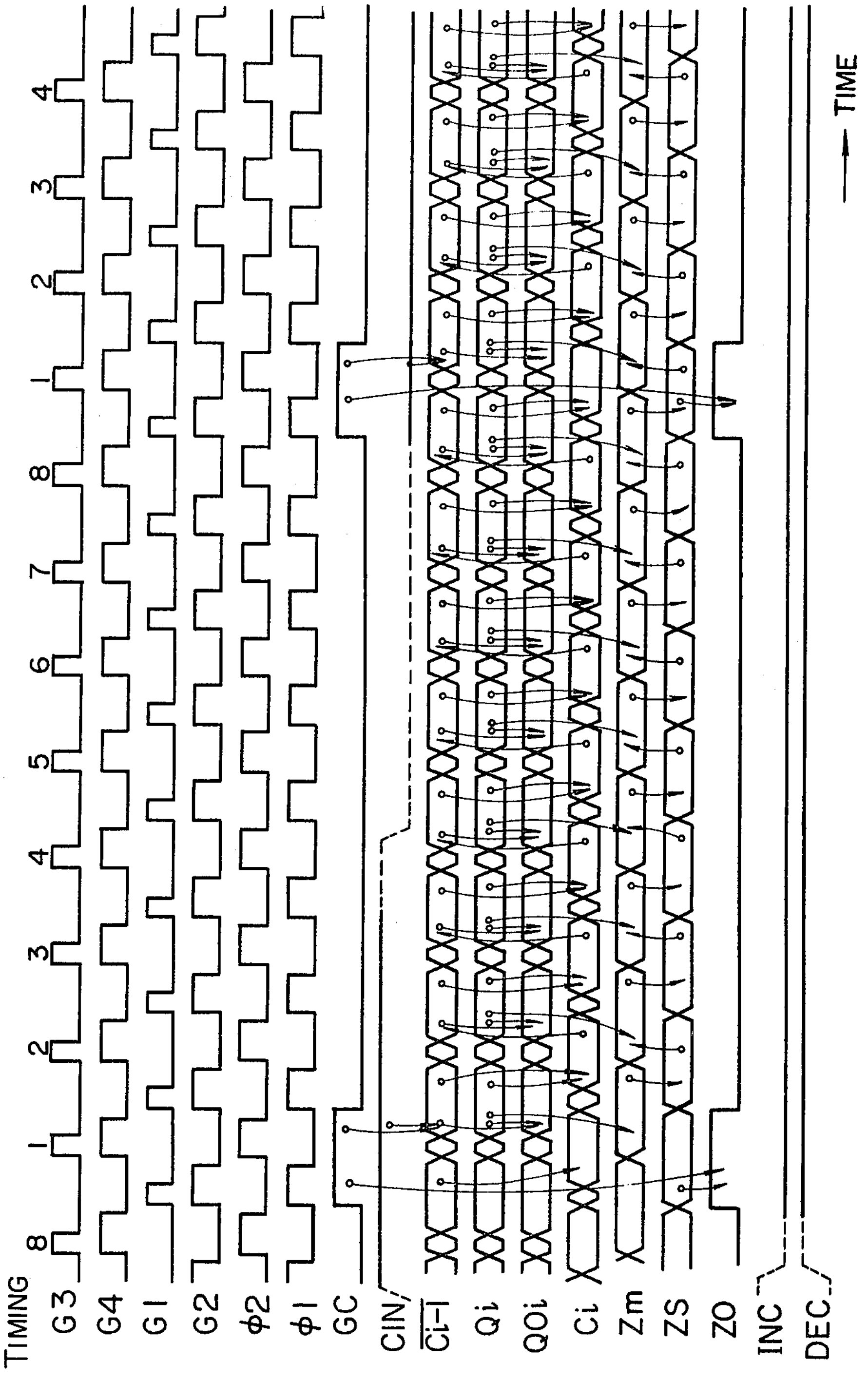
FIG. 25 illustrates the operation of FIG. 24.

Details of the increment/decrement circuit of FIG. 12 are shown in FIG. 24 and the operation thereof is illustrated in FIG. 25. Signal Qi is a one-bit signal shifted out from the shift circuit of the least significant bit (LSB) position of the shift register. In response to this input, the output of the increment/decrement circuit 1008 is transferred from a terminal QOi to the shift circuit of the most significant bit (MSB) position of the shift register. The relationship between the input and the output when the increment/decrement circuit 1008 functions as the decrementer is defined by the equations (7), (8), (9) and (10) described above and shown below $$QOo = Qo \oplus \mathrm{CIN} \quad (7)$$

$$QOi = Qi \oplus C(i-1) \quad (8)$$

$$Co = \overline{Qo} \cdot \mathrm{CIN} \quad (9)$$

$$Ci = \overline{Qi} \cdot C(i-1) \quad (10)$$

When the increment/decrement circuit 1008 functions as the incrementer, the relations are given by:

$$QOo = Qo \oplus \mathrm{CIN} \quad (11)$$

$$QOi = Qi \oplus C(i-1) \quad (12)$$

$$Co = Qo \cdot \mathrm{CIN} \quad (13)$$

$$Ci = Qi \cdot C(i-1) \quad (14)$$

In the decrement operation, the signal DEC=1 and the signal INC=0, and in the increment operation, INC=1 and DEC=0. As seen from the equations (7) and (8), and (11) and (12), the relations between the input and the output of the increment/decrement circuit are identical for the increment operation and the decrement operation. In the instance of the 8-bit shift register shown in FIG. 12, the LSB bit signal is first applied as Qi to the increment/decrement circuit. A signal GC is provided from a synchronizing circuit at every timing 1 which represents the start of shift.

The dynamic inverters 1076 and 1088 shown in FIG. 24 constitute a carry Ci generation circuit 1092. An AND gate 1080 opens and an AND gate 1078 closes at the timing of the H-level of the first signal GC so that the signal CIN is read in. Namely, at the timing of the first signal GC, the signal CIN is taken in as a carry and, at the next and subsequent timings GC, carries are logically determined in accordance with the equation (10) or (14), because the AND gate 1080 is closed and the AND gate 1078 is opened so that the carry output C(i−1) at the previous timing is applied to a NOR gate 1088. The NOR gate 1088 campares the previous carry C(i−1) with a new data Qi applied through a logical operation circuit 1090 and produces an output Ci=0 when the carry C(i−1)=0 thereby effecting no carry operation. The NOR gate produces an output Ci=1 when the carry C(i−1)=1 and a new data Qi=1 thereby effecting a carry operation.

The logical operation circuit 1090 executes an exclusive-or operation based on the input data Qi and the carry C(i−1) as shown by the equation (7) or (8). The output of an inverter 1072 is obtained as a result of the exclusive-or operation QOi.

A zero detection circuit 1094 is a circuit for accumulating the output signals QOi as an accumulated value Zm or Zs. Namely, the zero detection circuit executes an operation $$\sum_{i=1}^{N} QOi,$$

where N is 8 in this case. The output QOi is applied to a NOR gate 1084 together with the signal Zm. The output of the NOR gate is transmitted to the output of an inverter 1076 through a transistor 1062 at a timing of the clock G2 and held in a line between the inverter 1077 and a transistor as the signal Zs. The signal Zs is transmitted to an input of an AND gate 1076 through the transistor 1064 at the timing of the clock G4 and held as the signal Zm therein.

Transistors 1056 and 1058 and inverters 1068 and 1070 constitute the logical operation circuit 1090 for the equations (7), (8), (11) and (12). It controls the inversion of the input signal Qi by the inverter 1068 depending on the output $\overline{C(i-1)}$ of the carry generating circuit. At the clocks G3 and G4, an output signal QOi is determined based on the signal $\overline{C(i-1)}$ and the input Qi. The output QOi is also sent to the zero detection circuit 1094 which comprises the AND gates 1076 and 1082, the NOR gate 1084, the transistors 1062 and 1064 and the inverter 1077.

At the timing 1 of the clocks G1 and G2, the signal $\overline{C(i-1)}$ which represents CIN and the signal Qo or $\overline{Qo}$ are applied to the dynamic NOR gate 1088 which produces a carry in accordance with the equation (9) or (13). In the decrement operation, the transistor 1060 is turned ON by the signal DEC and the signal Qo is applied to the NOR gate 1088. In the increment operation, the signal INC is applied to turn ON the transistor 1061 so that the signal $\overline{Qo}$ is applied to the NOR gate 1088. As a result, the output Ci of the dynamic NOR gate 1088 assumes the value shown by the equation (9) or (13). In the zero detection circuit, the output of QOi is retained as Zs at the clock G2.

At the next timing 2, the signal GC is zero and the AND gate 1080 is OFF while the AND gate 1078 is ON. As a result, the signal Ci is held as $\overline{C(i-1)}$ through the AND gate 1078 and the NOR gate 1086. On the other hand, the next bit is applied as the input Qi. The signal $\overline{C(i-1)}$ and the input Qi are applied to the logical operation circuit 1090 which produces the output QOi. The output QOi is sent back to the shift register and also sent to the zero detection circuit 1094. At the clocks G1 and G2, the carry Ci is generated by the dynamic NOR gate 1088 based on the input Qi and the stored carry $\overline{C(i-1)}$. At the clock G2, the signal ZS is produced based on the output QOi and the stored signal Zm. At the timings 3 to 7, the above operation is repeated so that the data held in the shift register is decremented or incremented. At the next timing 1, the zero detection circuit produces the stored signal ZS at the output $\overline{ZO}$. When the output $\overline{ZO}$ is zero at the timing of GC, it is detected that the data held in the shift register is all zero.

When the signal CIN=0 is applied at the timing 1 at which the signal GC is generated, $\overline{C(i-1)}$ is "1" and neither the increment operation nor the decrement operation is effected and the input data is sent out as it is.

The "1" and "0" representations of the signals $\overline{C(i-1)}$, Qi, QOi and Ci shown in FIG. 25 are based on the assumption that the decrement operation is carried out with the shift register retaining the data "10001100". After the timings 1 to 8 have been generated, the content of the shift register changes to "10001011".

Figure 26:
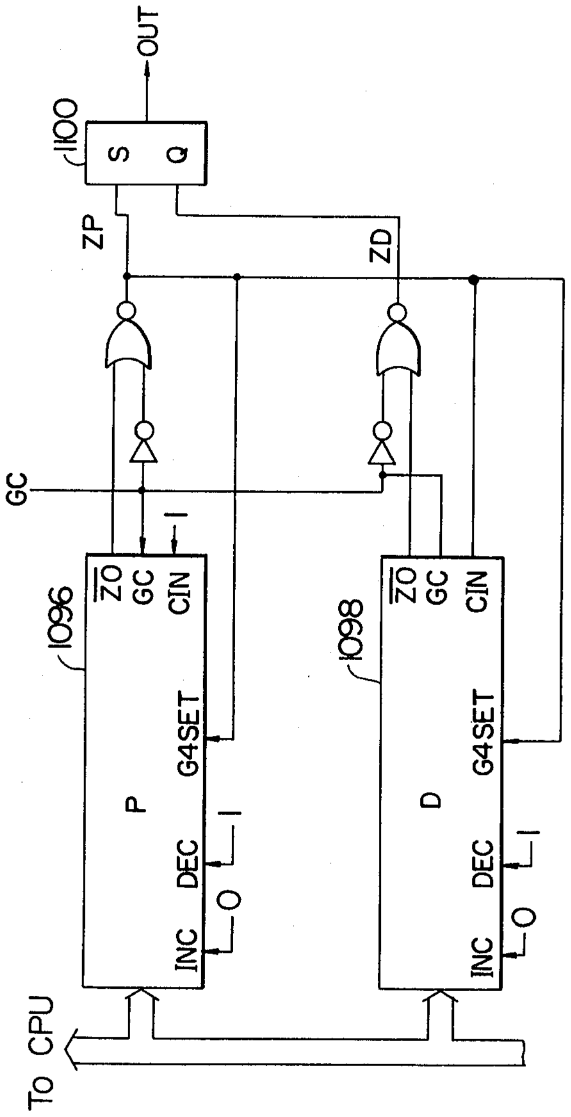
FIG. 26 shows a circuit diagram of a duty pulse converter circuit.
Figure 27:
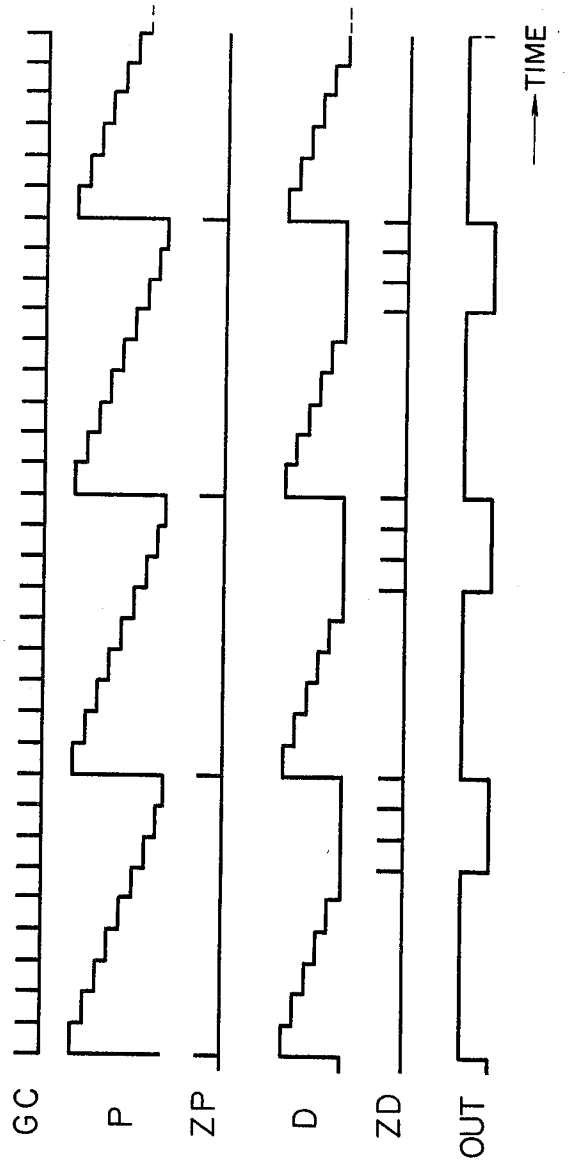
FIG. 27 illustrates the operation of FIG. 26.

A circuit which is commonly used by the CABC 162, the FSC 172 and the EGRC 178 shown in FIG. 4 is shown in FIG. 26. A synchronizing pulse generator circuit 1096 corresponds to the CABP, FSCP and EGRP shown in FIG. 4. A duty pulse generator circuit 1098 corresponds to the CABD, FSCD and EGRD. The pulse period data and the duty period data are set to the circuits 1096 and 1098. FIG. 27 shows a time chart for the circuit of FIG. 26. The details of the circuit 1096 and 1098 are shown in FIG. 12 and the basic operations thereof have been described hereinabove. In response to the signal ZP or G4SET, the data is loaded to the shift register from the latch registers which constitute the circuits 1096 and 1098. Simultaneously, a flip-flop 1100 is set by the signal ZP. The data of the latch register is sent from the CPU as the processed output. As explained above in conjunction with FIGS. 24 and 25, the data of the shift register completes one decrement cycle when the clocks $\phi_1$ and $\phi_2$ have been produced by the number of times determined by the number of bits of the shift register, that is, eight times. At this time point, the signal GC is produced. In synchronism with the signal GC, the shift registers of the circuits 1096 and 1098 and the increment/decrement circuit carry out the decrement operation. When the content of the shift register of the circuit 1098 reaches zero, the zero detection circuit causes the signal $\overline{ZO}$ to assume the L-level ("0")

and the flip-flop 1100 is reset by the signal ZD. When the content of the shift register of the circuit 1096 reaches zero, the zero detection circuit causes the signal $\overline{ZO}$ to assume the L-level and the signal ZP is generated. The flip-flop 1100 is again set by the signal ZP, which causes the signal G4SET to be applied to the circuits 1096 and 1098. As a result, the data is again loaded from the latch register to the shift register. In this manner, pulses at a duty ratio determined by the data loaded by the CPU are produced from the flip-flop 1100. By arranging three sets of the circuit shown in FIG. 24, the CABC 162, the FSC 172 and the EGRC 178 shown in FIG. 4 can be constructed.

Figure 28:
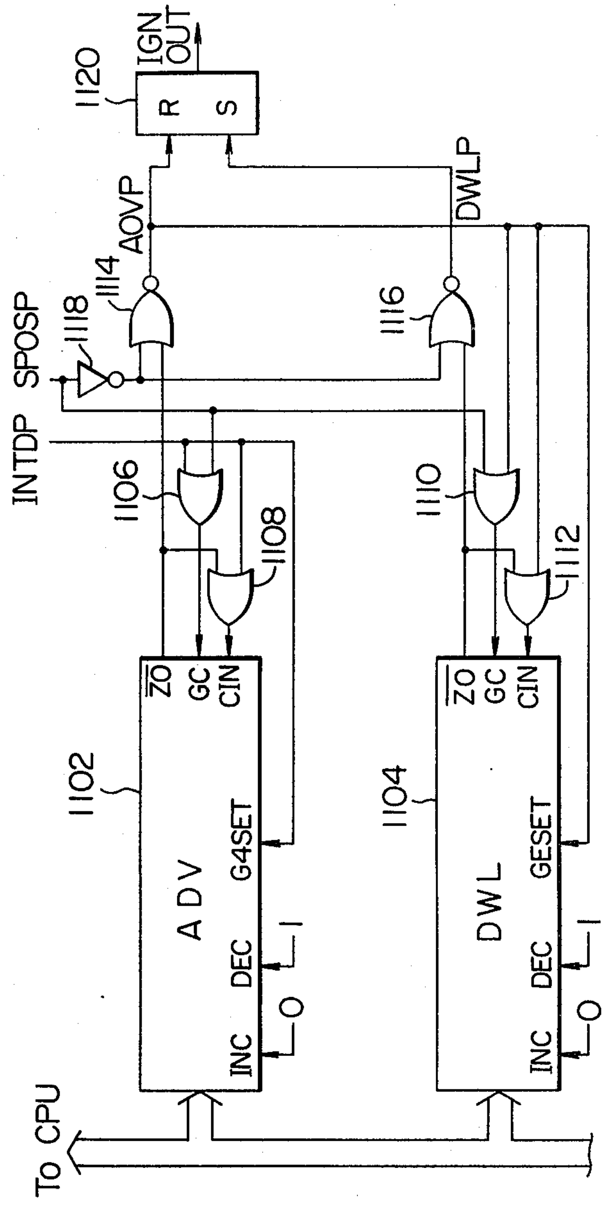
FIG. 28 shows a control circuit diagram for an ignition system.
Figure 29:
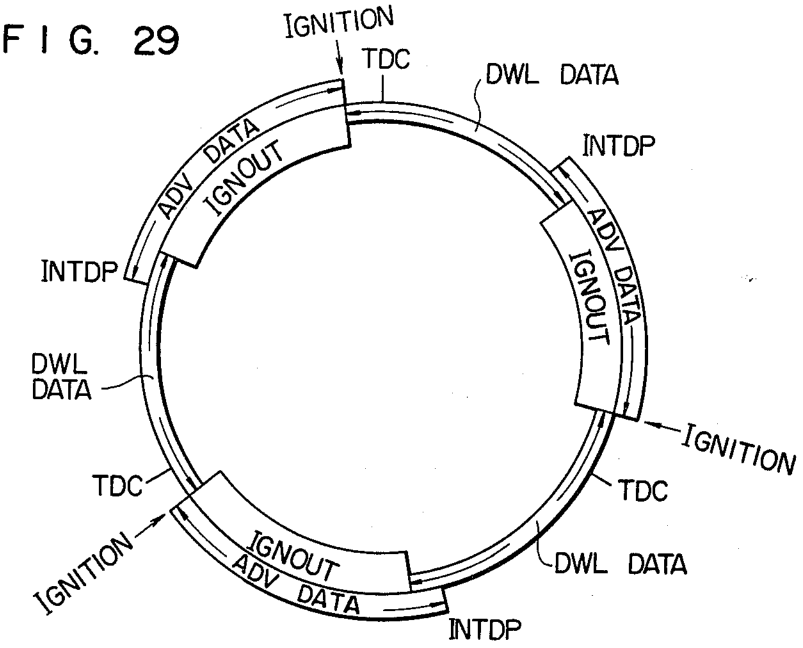
FIG. 29 illustrates the operation of FIG. 28.

FIG. 28 shows details of the IGNC 164 shown in FIG. 4. An ADV pulse generator circuits 1102 has a function of the ADV register shown in FIG. 4 and a DWL pulse generator circuit 1104 has a function of the DWL register shown in FIG. 4. The details of the ADV pulse generator circuit 1102 and the DWL pulse generator circuit 1104 are shown in FIG. 12. The ADV data and the DWL data are loaded from the CPU to the ADV pulse generator circuit 1102 and the DWL pulse generator circuit 1104. The ADV data and the DWL data are processed by the CPU. As shown in FIG. 29, the ADV data is the number of pulses POS between a reference crank angle signal INTDP and an ignition position and the DWL data is the number of the angular pulses POS between the ignition position and a start of conduction position of an ignition coil for the next ignition. While a signal IGNOUT shown in FIG. 27 is up, a current flows through the ignition coil.

The pulse INTDP is applied as the G4SET to the ADV pulse generator circuit. Thus, the ADV data is transferred from the latch register which retains the ADV data sent from the CPU, to the shift register. The signal INTDP is further applied as the signal CIN through the OR gate 1108. Since the input DEC is "1" and the input INC is "0" at this time, the decrement operation starts. The signal CIN (H-level) is applied from the ouput $\overline{ZO}$ via the OR gate 1108 until the content of the shift register reaches zero. A signal SPOSP is applied to the terminal GC. This signal is produced at the timing of GC based on the POS pulse of a crank angle sensor and will be described in detail hereinafter. The shift register of the ADV pulse generator circuit carries out the decrement operation in response to the signal SPOSP. When the content of the ADV shift register reaches zero, the output $\overline{ZO}$ assumes the low level and in response to the signal SPOSP which is applied through the inverter 1118 the NOR gate 1114 produces the output ADVP which resets the flip-flop 1120. As a result, the signal IGNOUT is terminated. As a result, a primary current in the ignition coil of the ignition device 170 shown in FIG. 4 stops flowing so that the ignition occurs.

Figure 30:
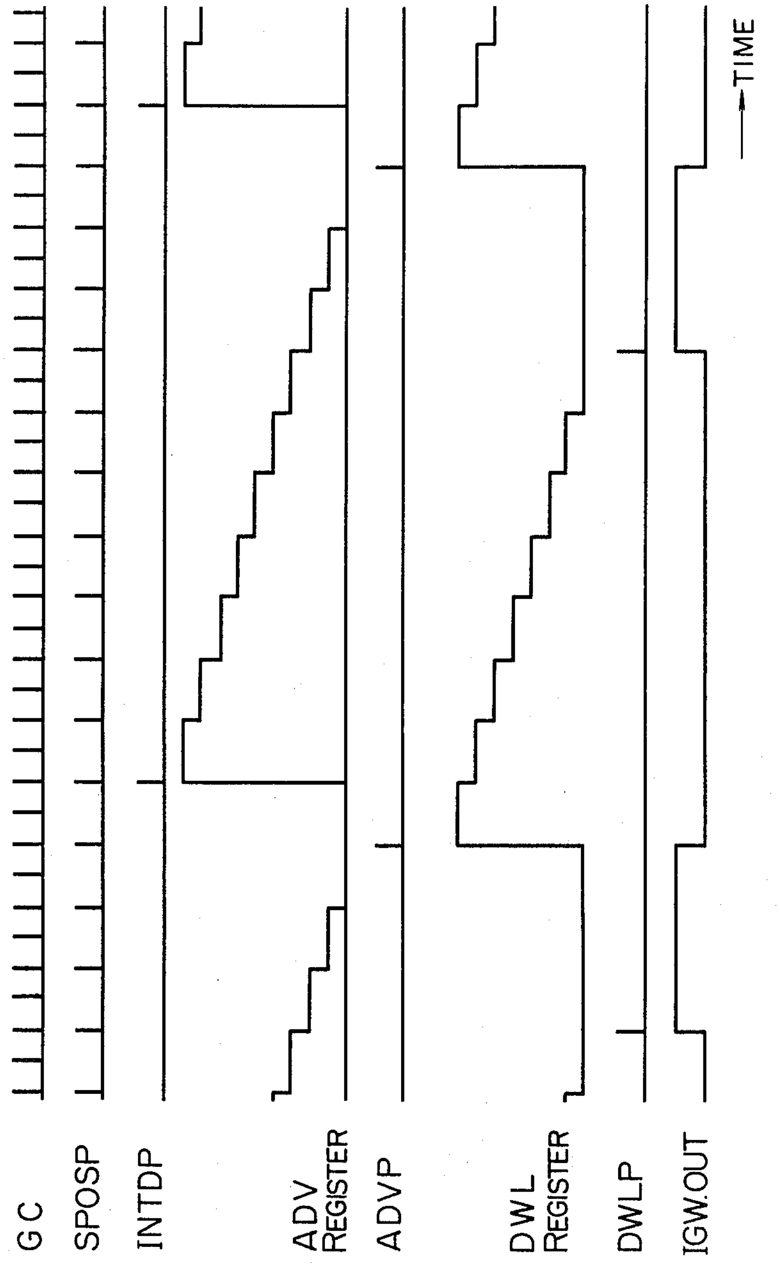
FIG. 30 shows a time chart for FIG. 29.

As shown in FIGS. 29 and 30, the DWL pulse generator circuit starts the decrement operation from the output ADVP which is an ignition timing. Accordingly, when the output ADVP is applied as the G4SET, the data is transferred from the latch circuit in the DWL pulse generator circuit 1004 to the shift register. Since the signal DEC is "1" and the signal INC is "0" in the DWL pulse generator circuit, the signal CIN which instructs the decrement operation is applied through the OR gate 1112 at the timing of the signal ADVP, and the decrement instruction continues to be applied until the content of the shift register reaches zero and the output $\overline{ZO}$ of the zero detection circuit changes from the H-level to the L-level. The timing of the decrement operation is determined by the signal SPOSP which is applied to GC via the OR gate 1110. When the content of the shift register reaches zero and the output $\overline{ZO}$ of the zero detection circuit assumes the low level, the signal DWLP is produced from the NOR gate 1116 at the timing of the signal SPOSP and the flip-flop 1120 is set. As a result, the signal IGNOUT is produced and the primary current of the ignition coil flows. As described above, the flip-flop 1120 is reset by the output of the ADV pulse generator circuit 1102 so that the primary current of the ignition coil is blocked and the ignition takes place.

Figure 31:
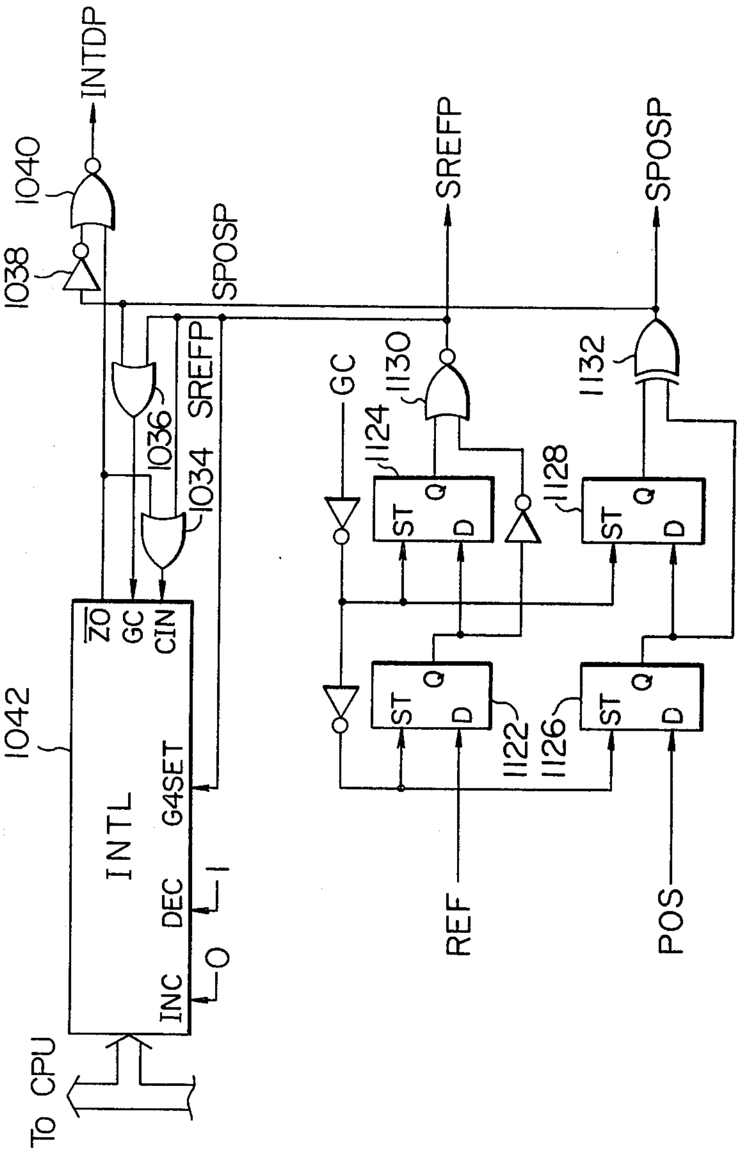
FIG. 31 shows a circuit diagram of an INTDP pulse converter circuit.
Figure 32:
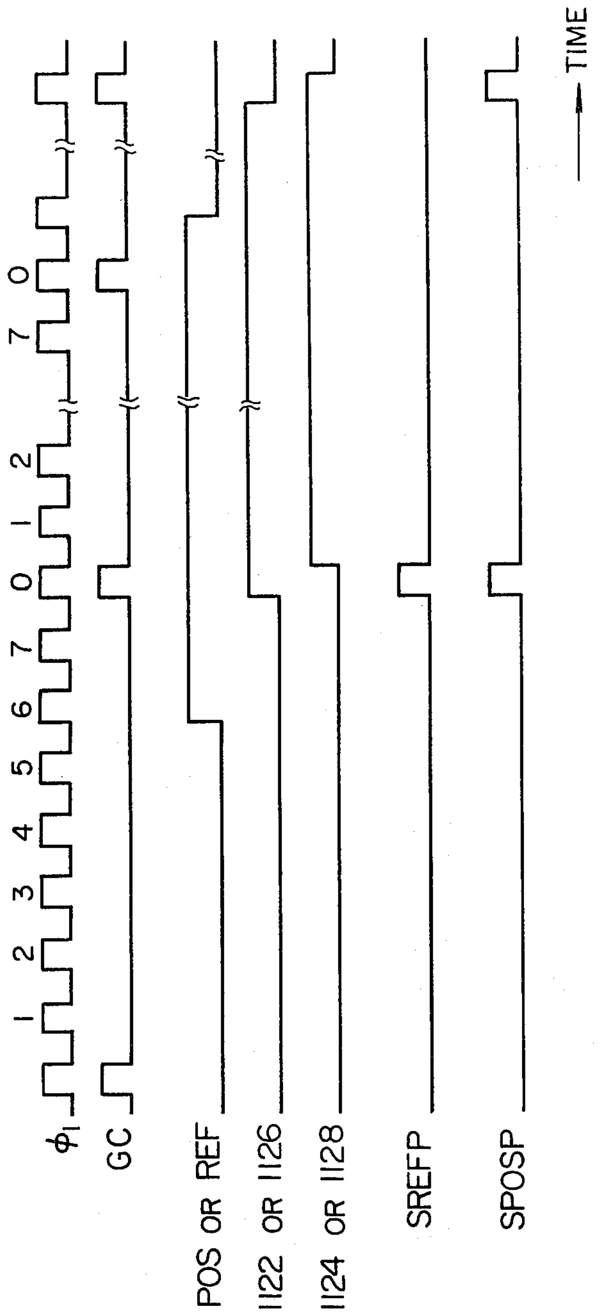
FIG. 32 shows a time chart for FIG. 31.

A circuit for generating the input signals INTDP and SPOSP shown in FIG. 28 is shown in FIG. 31 and the operational timing thereof is shown in FIG. 30. Signals REF and POS are sent from the sensor 146 shown in FIG. 4. The signal REF is a reference crank angle signal of the engine and it is a pulse train generated at an angle determined by the number of cylinders of the engine, that is, at every 180° for the four-cylinder engine, at every 120° for the six-cylinder engine and at every 90° for the eight-cylinder engine. The signal POS is a pulse train which is generated at every one degree of crank angle. Since those pulses are synchronized with the rotation of the engine, they are asynchronous with the internal clock of the circuit. The signal REF is applied to a D-type flip-flip 1122 while the signal POS is applied to a D-type flip-flop 1126. The D-type flip-flops 1122 and 1126 produce the outputs in response to the clock GC. D-type flip-flops 1124 and 1128 may be synchronized with the clock $\phi$ (clock $\phi_1$ or $\phi_2$), but in the present embodiment they are synchronized with the inverted signal of GC. A signal SREFP is produced from an output of a NOR gate 1130 at the timing of the signal GC of the first clock $\phi$ after the rise of the input signal (reference angular pulse) REF. An output SPOSP of an Exclusive OR gate 1132 is produced at the timing of the first GC after the rise of the input signal (angular pulse) POS and at the timing of the first GC after the foll of the input signal POS. As a result, the signal SPOSP is generated at every 0.5 degrees of the crank angle from the pulses POS which are generated every one degree of the crank angle.

An INTL pulse generator circuit 1042 generates a reference crank angle signal INTDP necessary for the control from the signal SREFP which is determined by the mounting position of the sensor. The signal SREFP is applied as the signal G4SET to the INTL pulse generator circuit 1042 so that the data is loaded from the latch circuit to the shift register. This data represents a phase difference between the signal SREFP and the reference signal INTDP. The shift register then carries out the decrement operation in response to the signal SPOSP applied to GC via an OR gate 1036, and when the content of the shift register reaches zero, the output ZO assumes the low level and the signal INTDP is sent out via a NOR gate 1040 in synchronism with the signal SPOSP.

Figure 33:
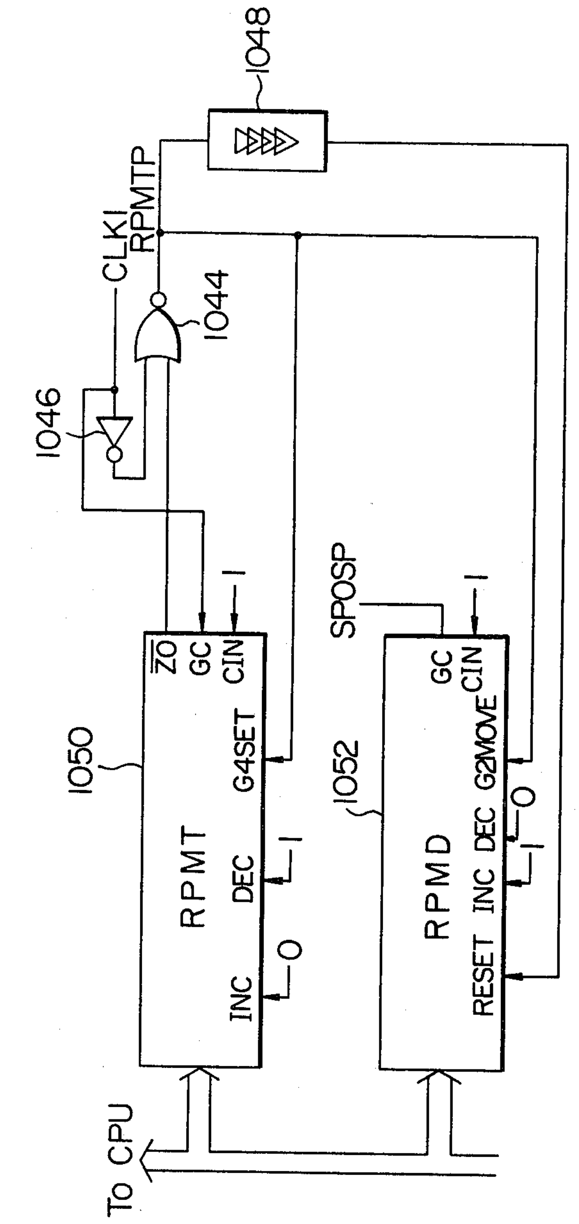
FIG. 33 shows a circuit diagram of a rotation speed detection circuit.
Figure 34:
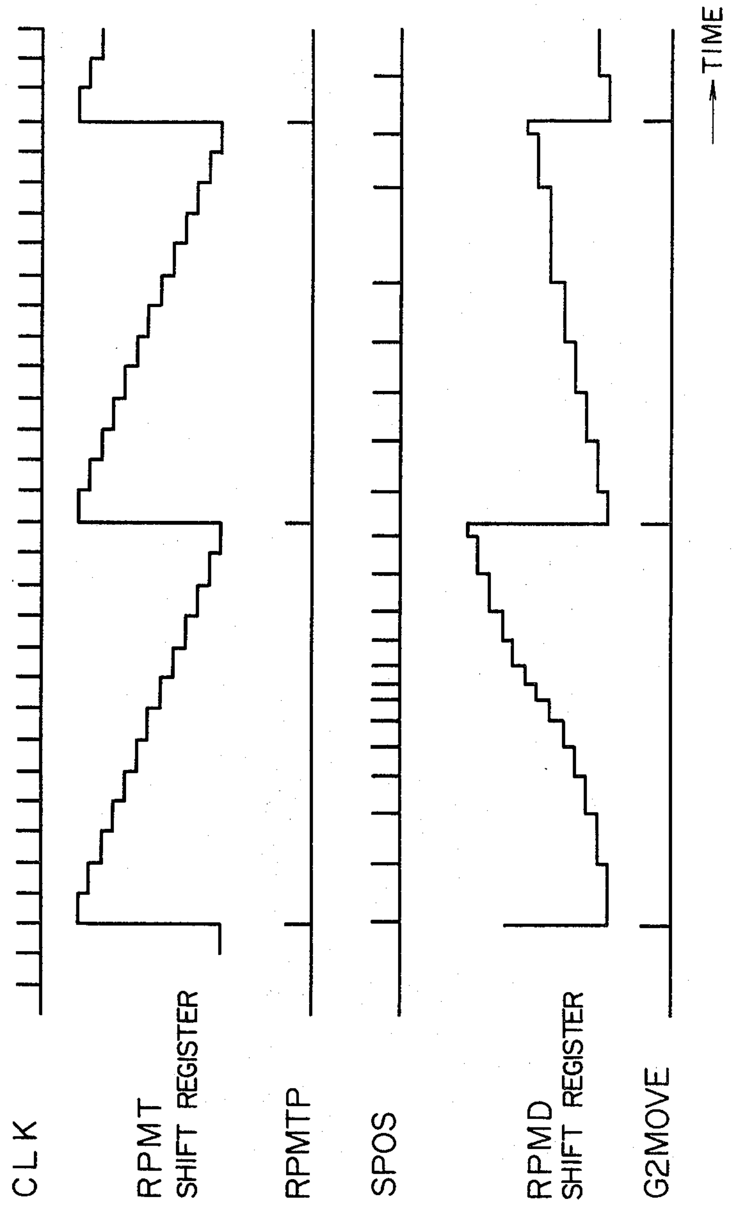
FIG. 34 illustrates the operation of FIG. 33.

FIG. 33 shows a rotation speed detection circuit and FIG. 34 shows a timing chart thereof. A period data for determining the period of a period pulse generator circuit RPMT 1050 is loaded from the CPU to a latch circuit of the RPMT circuit. An output RPMTP of a NOR gate 1044 which depends on an output $\overline{ZO}$ of the RPMT circuit is applied as the G4SET to the RPMT circuit 1050 so that the data is loaded from the latch register of the RPMT circuit to the shift regiseter in response to the signal RPMTP. Since the "1" is always applied as the signal CIN, the shift register of the RPMT circuit 1050 carries out the decrement operation in response to the clock CLK applied to GC. As shown in FIG. 34, when the content of the shift register of the RPMT circuit reackes zero, the zero detection circuit causes the signal $\overline{ZO}$ to assume the L-level and the signal RPMT (H-level) is produced from the NOR gate 1044. In response to the signal RPMT, the data is loaded from the latch register of the RPMT circuit 1050 to the shift register. Accordingly, the signal RPMTP is produced from the NOR gate 1044 at a frequency determined by the data loaded from the CPU. A shift register of a pulse count circuit RPMD 1052 counts the signals SPOSP generated in the period of the signal RPMTP and sends back the count from the shift register to the latch register in response to the signal RPMTP. Thereafter, the content of the shift register of the RPMD circuit 1052 is reset by the signal RPMTP which is sent via a delay circuit 1048. Since the RPMTP circuit receives "0" at the terminal DEC and "1" at the terminal INC, it carries out the increment operation. The timing of the increment operation is determined by the signal SPOSP applied to the terminal GC. Accordingly, the shift register of the RPMD circuit retains the accumulated count of the signal SPOSP in a predetermined period, that is, the period of the signal RPMTP. Since this count is transferred from the shift register to the latch register and retained therein in response to the signal RPMTP which is applied to the circuit RPMD as the signal G2MOVE, the data representative of the rotation speed is obtained by reading the data stored in the latch register by the CPU.

Figure 35:
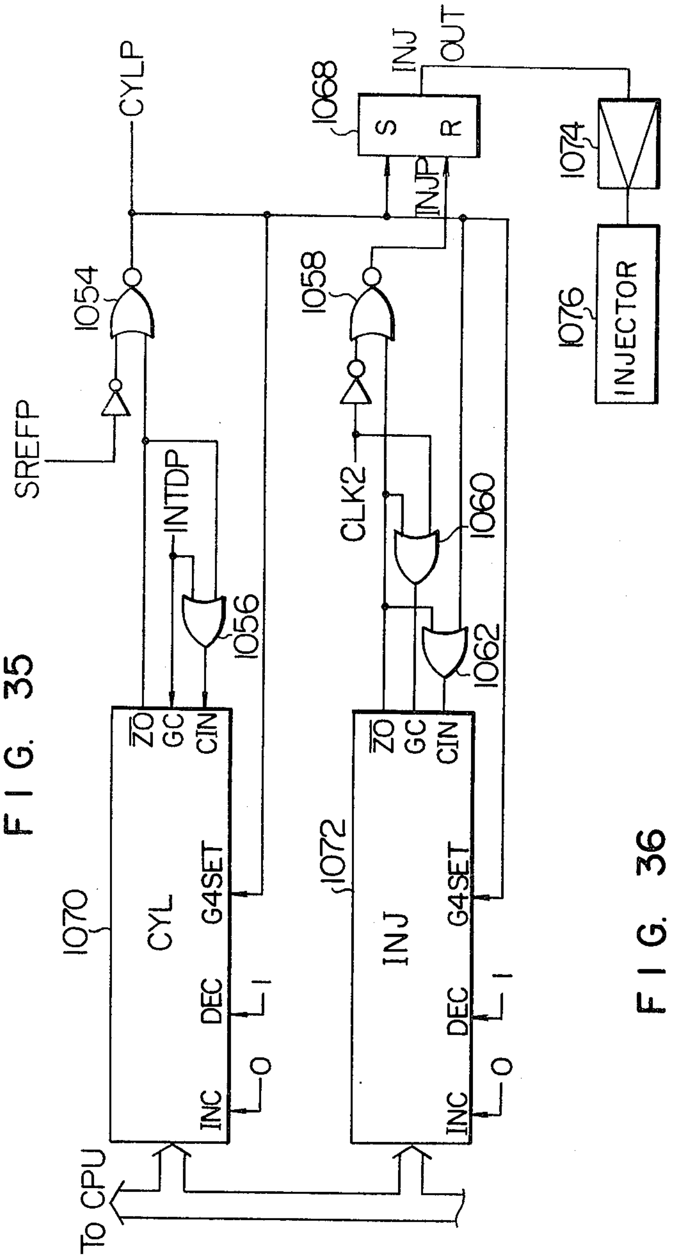
FIG. 35 shows a circuit diagram of a fuel jet circuit.
Figure 36:
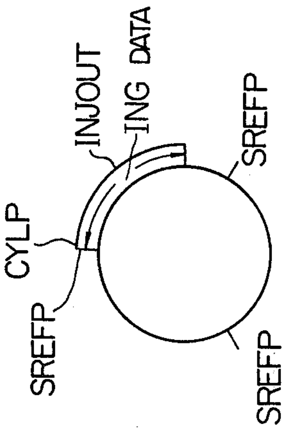
FIG. 36 illustrates the operation of FIG. 35.

FIG. 35 shows an embodiment in which the present invention is applied to a fuel injecting apparatus. A CYL pulse generator circuit 1070 counts signals SREFP. For the six-cylinder engine, for example, one signal CYLP is generated for every three counts of the signal SREFP, as shown in FIG. 34. The count differs depending on the number of cylinders, and it is sent from the CPU and retained in a latch register of the CYL circuit. When the predetermined number of signals CYLP is generated and applied as G4SET, the data in the latch register is loaded to the shift register. The data is decremented in response to the signal INTDP, and each time the content of the shift register reaches zero, the output $\overline{ZO}$ assumes the L-level and the signal CYLP is produced via a NOR gate 1054 at the timing of the signal SREFP. A flip-flop 1068 is set by the signal CYLP. The data representative of a fuel injection time is set to an INJ pulse generator circuit from the CPU. This data is loaded to the shift register in response to the signal CYLP applied to the G4SET from the latch register. The data is decremented in response to the signal CLK 2 applied to GC via an OR gate 1060. When the clock GC is applied in place of the signal CLK 2, the decrement operation is carried out in response to the clock GC. As shown in FIG. 36, a time related to the INJ data starts to be measured in response to the signal CYLP. When the INJ data reaches zero by the decrement operation by the clock CLK 2, the output $\overline{ZO}$ assumes the low level and the signal INJP is applied to a reset terminal of the flip-flop 1068 via the NOR gate 1058 to reset the flip-flop 1068. As a result, the output INJOUT of the flip-flop 1068 produces a signal depending on the INJ data which was loaded from the CPU. The output signal is amplified by an amplifier circuit 1074 and the applied to an injector 1076 to inject the fuel.

Figure 37:
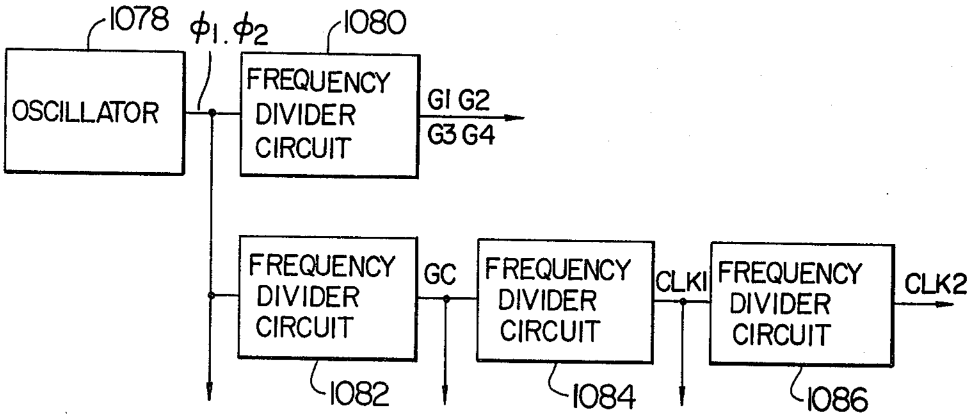
FIG. 37 shows a circuit diagram of a timing signal generator circuit.

FIG. 37 shows a signal generator circuit which generates the signals $\phi_1$ and $\phi_2$ from an oscillator 1078. From those signals, the clocks G1 to G4 are produced by a wave shaper circuit 1080 as shown in FIG. 25 and the signals GC also shown in FIG. 25 are produced by a frequency divider circuit 1082. The output GC of the frequency divider circuit 1082 is further divided by frequency divider circuits 1084 and 1086 to produce the timing pulses CLK 1 and CLK 2.

Figure 38:
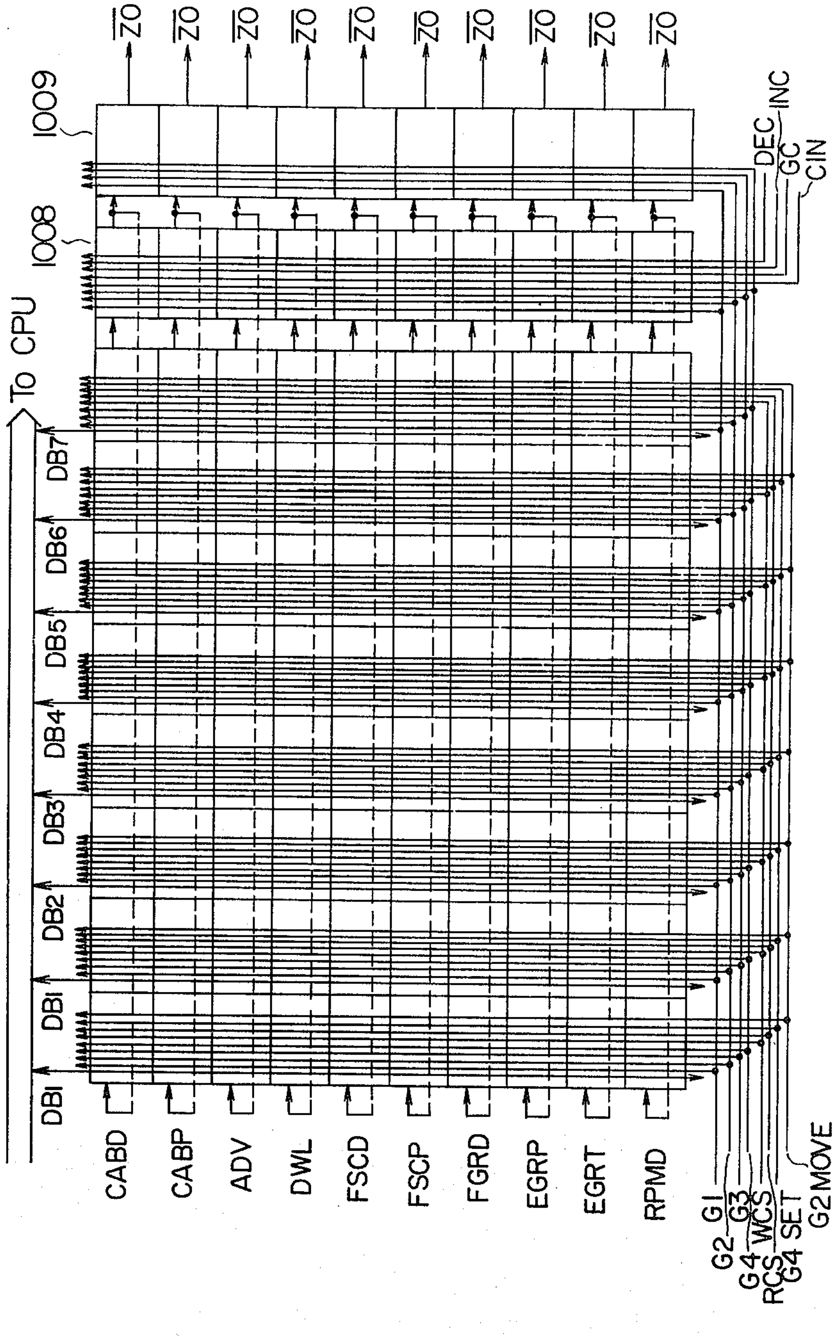
FIG. 38 shows an arrangement of the register, increment/decrement circuit, zero detection circuit, data line and control signal line.

FIG. 38 shows an embodiment of the input/output pulse converter circuit of FIG. 4 constructed by the basic circuits shown in FIG. 12. The registers CABD, CABP, ADV, DWL, FSCD, FSCP, EGRD, EGRP, RMPT and RPMD, and the associated increment/decrement circuits 1008 and the zero detection circuits 1009 are arranged regularly. The registers each comprises an 8-bit register and the clocks G1 to G4 and the control signals WCS, RCS, G4SET and G2MOVE are applied to the respective bits. The control signals INC, DES, GC and CIN are applied to the increment/decrement circuits.

In accordance with the present invention, since the pulse converter circuits and the counting circuits are constructed by the shift registers and the increment/decrement circuits which are constructed by simple elements, they may be arranged regularly and the heat generation is low. Furthermore, the dynamic element may be used as shown in the embodiments. In this case, the heat generation is further decreased to approximately one half of that of a conventional digital engine control circuit.

In addition, since the elements can be arranged regularly, the integration efficiency is enhanced and the size is reduced to approximately one half of that of prior art apparatus. Furthermore, the arrangement may be multilayered with the bit lines of the data bus as shown in FIG. 38. In this case, the integration efficiency is further enhanced because the data bus area is also contained.

The engine stop detection circuit and the INTV interruption circuit shown in the embodiment of FIG. 11 may be constructed by the basic circuits of FIG. 12 in a similar fashion.

What is claimed is:

1. For use in a control apparatus for an internal combustion engine wherein at least one condition of the engine is detected and a reference value of a control mechanism for controlling the engine is calculated based on the detected engine condition and a control pulse signal is produced in accordance with the calculated reference value to apply said control pulse signal to said control mechanism in order to control the engine in accordance with said reference value, and including means for producing the control pulse signal in accordance with said reference value includes a clock signal generator circuit for generating a periodic clock signal having a predetermined period and a plurality of pulse signal generator circuits, each pulse signal generator circuit including:

a shift register to which said reference value is loaded in the form of a digital signal, said shift register being adaptable to receive said periodic clock signal from said clock signal generator circuit for shifting the contents of said shift register one bit at a time, a controllable modification circuit for controllably modifying an input signal so as to controllably change the value thereof by a predetermined value, a detection circuit, coupled to the output of said controllable modification circuit, for detecting the content of said shift register, and a data transfer circuit for connecting the output and the input of said shift register in a closed loop through said controllable modification circuit, whereby the contents of said shift register loaded therein is controllably modified by applying the content of the shift register to said controllable modification circuit and then sending it back to the shift register and said detection circuit monitors the output of said controllable modification circuit and detects a point of detection when the content of the shift register reaches a predetermined value so that the control pulse signal is produced from or to the point of detection.

2. A pulse signal generator circuit according to claim 1, wherein said controllable modification circuit comprises an increment/decrement circuit for increasing or decreasing an input signal by a predetermined value.

3. A pulse signal generator circuit according to claim 2, wherein said pulse signal producing means includes first and second pulse signal generator circuits and a flip-flop, said first pulse signal generator circuit including a first shift register which is loaded with a reference value representing the period of said pulse signal and the counter thereof being decreased by one in response to said clock signal, said first pulse signal generator circuit producing a first output pulse and applying it thereto thereby loading the reference value thereto and also applying it to a set input of said flip-flop when the content of the first shift register becomes zero, said second pulse signal generator circuit including a second shift register which is loaded with a reference value representing a duty of said pulse signal and starting a decrement operation in response to said first output signal in such a manner that the content thereof is decreased by one in response to said clock signal, said second pulse signal generator circuit producing and applying a second output pulse to a reset input of said flip-flop when the content of said second shift register becomes zero, the output of said flip-flop being obtained as said control pulse signal.

4. A pulse signal generator circuit according to claim 2, wherein said pulse signal producing means includes first and second logic circuits and a first pulse signal generator circuit, said first logic circuit producing a first angular timing pulse in synchronism with said clock signal and a first angular pulse which is generated every rotation of a first predetermined crank angle, said second logic circuit producing a second angular timing pulse in synchronism with said clock signal and a second angular pulse which is generated every rotation of a second predetermined crank angle relating to the number of cylinders of said engine, said first pulse signal generator circuit being loaded in response to said second angular timing pulse with a reference value representing the difference between a reference crank angle at which said reference crank angle pulse is generated and a crank angle at which said second angular timing pulse is generated, said first pulse signal generator circuit starting a decrement operation in response to said second angular timing pulse in such a manner that the content of said first pulse signal generator circuit is decreased by one in response to said first angular timing pulse, and said first pulse signal generator circuit produces an output pulse as said reference crank angle pulse in synchronism with said second angular timing pulse when the content thereof becomes zero.

5. A pulse signal generator circuit according to claim 4, wherein said pulse signal producing means includes a second and third pulse signal generator circuits and a flip-flop, said second pulse signal generator circuit being loaded with a reference value representing the difference between said reference crank angle and an ignition crank angle and starting a decrement operation in response to said reference crank angle pulse in such a manner that the current thereof is decreased by one in response to said first angular timing pulse, said second pulse signal generator circuit producing and applying a first output pulse to a reset input of said flip-flop when the content thereof becomes zero, said third pulse signal generator circuit being loaded with a reference value representing the difference between the ignition crank angle and a crank angle at which the conduction of an ignition coil for the next ignition is started and starting a decrement operation in response to said first output pulse in such a manner that the content thereof is decreased by one in response to said first angular timing pulse, said third pulse signal generator circuit producing and applying a second output pulse to a set input of said flip-flop when the content thereof becomes zero, the output of said flip-flop being obtained as said control pulse signal and applied to said ignition coil.

6. A pulse signal generator circuit according to claim 4, wherein said pulse signal producing means includes second and third pulse signal generator circuits and a flip-flop, said second pulse signal generator circuit being loaded with a reference value related to the number of cylinders of said engine and the content thereof being decreased by one in response to said reference crank angle pulse, said second pulse signal generator circuit producing and applying a first output pulse to itself thereby loading the reference value thereto and to a set input of said flip-flop when the content thereof becomes zero, said third pulse signal generator circuit being loaded with the reference value representing a fuel injection time period and starting the decrement operation of said reference value in response to said first output pulse in such a manner that the content thereof is decreased by one in response to said clock signal, said third pulse signal generator circuit producing and applying a second output pulse to a reset input of said flip-flop when the content thereof becomes zero, the output of said flip-flop being obtained as said control pulse signal for controlling a fuel injector.

7. A pulse signal generator circuit according to claim 4, wherein said pulse signal producing means includes a second and third pulse signal generator circuits, said second pulse signal generator circuit being loaded with a reference value representing a predetermined time period and the content thereof is decreased by one in response to said clock signal, said second pulse signal generator circuit producing and applying an output signal to itself thereby loading the reference value thereto and to said third pulse signal generator circuit when the content thereof becomes zero, said third pulse signal generator circuit resetting the content thereof and starting an increment operation in response to said output signal in such a manner that the content thereof is increased by one in response to said first angular timing pulse the content of said third pulse signal generator circuit being read out in response to said output signal.

8. A pulse signal generator circuit according to claim 2, wherein each pulse signal generator circuit includes a latch register having bit positions corresponding to bit positions of said shift register.

9. A pulse signal generator circuit according to claim 8, wherein each bit position of said shift register is composed of a master and a slave arrangement and each bit position of said latch register is composed of a master and a slave arrangement, said master arrangement of said bit position of said shift register being shared with said slave arrangement of the corresponding bit position of said latch register.

10. A pulse signal generator circuit according to claim 8, wherein each bit position of said shift register is composed of a master and a slave arrangement and each bit position of said latch register is composed of a master and a slave arrangement, said slave arrangement of said bit position of said shift register being shared with said master arrangement of the corresponding bit position of said latch register.

11. A pulse signal generator circuit according to claim 1, wherein a respective stage of said shift register is comprised of a bit shift/latch circuit having:

first means, coupled to an input terminal of said stage and responsive to a first clock timing signal portion of said periodic control signal, for storing an input signal applied to said input terminal; and second means, coupled to said first means and an output terminal of said stage and responsive to a second clock timing signal portion of said periodic clock signal, for transferring an input signal stored by said first means to said output terminal; and further including a data storage/transfer circuit having a plurality of stages corresponding to the number of stages of said shift register and respectively coupled in parallel with the stages of said shift register, for supply data to to said shit register, a respective stage of said data storage/transfer circuit including:

third means, coupled with the input signal flow path of said first means and responsive to at least one of said first and second clock timing signal portions of said periodic signal, for storing a data signal supplied thereto, while permitting the transfer of an input signal through said signal flow path of said first means to be stored by said first means and transferred to said output terminal.

12. An output circuit for producing a pulse in accordance with data supplied thereto, comprising:

a shift register, coupled to receive said data;

a controllable signal modification circuit for controllably modifying an input signal by a predetermined value having an input coupled to an end stage of said shift register from which signals shifted therethrough are derived and an output coupled to an opposite end stage of said shift register; and a fixed state detection circuit having in in put coupled to the output of said controllable signal modification circuit and producing an output pulse in response to the output of said controllable signal modification circuit maintaining a prescribed representative state for the entirety of the shifting of the contents of said shift register through the total number of stages therein.

13. An output circuit according to claim 12, wherein said fixed state detection circuit comprises a zero detection circuit and said prescribed representative state corresponds to the zero state.

14. An output circuit according to claim 12, further including a data storage/transfer register having a plurality of stages corresponding to the number of stages of said shift register and respectively coupled in parallel with the stages of said shift register, for supplying said data to said shift register.

15. An output circuit for an internal combustion engine according to claim 12, wherein said controllable signal modification circuit comprises an increment-/decrement circuit.

16. An output circuit according to claim 14, wherein a respective stage of said shift register is comprised of a bit shift/latch circuit having:

first means, coupled to an input terminal of said stage and responsive to a first control signal for storing an input signal applied to said input terminal;

second means, coupled to said first means and an output terminal of said stage and responsive to a second control signal, for transferring an input signal stored by said first means to said output terminal; and wherein a respective stage of said data storage/transfer register includes:

third means, coupled with the input signal flow path of said first means and responsive to at least one of said first and second control signals, for storing a data signal applied thereto, while permitting the transfer of an input signal through said signal flow path of said first means to be stored by said first means and transferred to said output terminal.

* * * * *